(12) United States Patent
Butler

(10) Patent No.: US 11,886,010 B2
(45) Date of Patent: Jan. 30, 2024

(54) FIBER OPTIC TERMINALS AND FIBER OPTIC NETWORKS HAVING VARIABLE RATIO COUPLERS

(71) Applicant: Corning Research & Development Corporation, Corning, NY (US)

(72) Inventor: Douglas Llewellyn Butler, Painted Post, NY (US)

(73) Assignee: Corning Research & Development Corporation, Corning, NY (US)

(*) Notice: Subject to any disclaimer, the term of this patent is extended or adjusted under 35 U.S.C. 154(b) by 336 days.

(21) Appl. No.: 17/063,930

(22) Filed: Oct. 6, 2020

(65) Prior Publication Data
US 2021/0103099 A1 Apr. 8, 2021

Related U.S. Application Data

(60) Provisional application No. 62/911,731, filed on Oct. 7, 2019.

(51) Int. Cl.
| | | |
|---|---|---|
| *G02B 6/26* | (2006.01) | |
| *G02F 1/01* | (2006.01) | |
| *H04B 10/564* | (2013.01) | |
| *H04J 14/02* | (2006.01) | |

(52) U.S. Cl.
CPC ............ *G02B 6/262* (2013.01); *G02F 1/0115* (2013.01); *H04B 10/564* (2013.01); *H04J 14/0221* (2013.01)

(58) Field of Classification Search
CPC ...... G02B 6/262; G02B 6/4446; G02B 6/283; G02F 1/0115; H04B 10/564; H04J 14/0221
See application file for complete search history.

(56) References Cited

U.S. PATENT DOCUMENTS

| | | |
|---|---|---|
| 3,792,284 A | 2/1974 | Kaelin |
| 3,912,362 A | 10/1975 | Hudson |
| 4,148,557 A | 4/1979 | Garvey |
| 4,167,303 A | 9/1979 | Bowen et al. |
| 4,168,109 A | 9/1979 | Dumire |
| 4,336,977 A | 6/1982 | Monaghan et al. |

(Continued)

FOREIGN PATENT DOCUMENTS

| | | |
|---|---|---|
| AU | 2006232206 A1 | 10/2006 |
| CN | 1060911 A | 5/1992 |

(Continued)

OTHER PUBLICATIONS

Coaxum, L., et al., U.S. Appl. No. 62/341,947, "Fiber Optic Multiport Having Different Types of Ports for Multi-Use," filed May 26, 2016.

(Continued)

*Primary Examiner* — John Bedtelyon
(74) *Attorney, Agent, or Firm* — Michael E. Carroll, Jr.

(57) ABSTRACT

Fiber optic terminals and fiber optic networks having variable ratio couplers are disclosed. The fiber optic terminals comprise a shell having a portion of a variable ratio coupler disposed therein. The variable ratio coupler comprises an optical input, a first optical output, a second optical output and a control. The control may be adjusted for changing an output power level between the first optical output and the second optical output.

52 Claims, 11 Drawing Sheets

(56) References Cited

U.S. PATENT DOCUMENTS

| | | | |
|---|---|---|---|
| 4,373,777 A | 2/1983 | Borsuk et al. | |
| 4,413,880 A | 11/1983 | Forrest et al. | |
| 4,423,922 A | 1/1984 | Porter | |
| 4,440,471 A | 4/1984 | Knowles | |
| 4,461,537 A | 7/1984 | Raymer et al. | |
| 4,547,937 A | 10/1985 | Collins | |
| 4,615,581 A | 10/1986 | Morimoto | |
| 4,634,858 A * | 1/1987 | Gerdt | G02F 1/3131 73/705 |
| 4,688,200 A | 8/1987 | Poorman et al. | |
| 4,690,563 A | 9/1987 | Barton et al. | |
| 4,711,752 A | 12/1987 | Deacon et al. | |
| 4,723,827 A | 2/1988 | Shaw et al. | |
| 4,741,590 A | 5/1988 | Caron | |
| 4,842,363 A | 6/1989 | Margolin et al. | |
| 4,844,570 A | 7/1989 | Tanabe | |
| 4,877,303 A | 10/1989 | Caldwell et al. | |
| 4,944,568 A | 7/1990 | Danbach et al. | |
| 4,979,792 A | 12/1990 | Weber et al. | |
| 5,007,860 A | 4/1991 | Robinson et al. | |
| 5,067,783 A | 11/1991 | Lampert | |
| 5,073,042 A | 12/1991 | Mulholland et al. | |
| 5,076,656 A | 12/1991 | Briggs et al. | |
| 5,085,492 A | 2/1992 | Kelsoe et al. | |
| 5,088,804 A | 2/1992 | Grinderslev | |
| 5,091,990 A | 2/1992 | Leung et al. | |
| 5,131,735 A | 7/1992 | Berkey et al. | |
| 5,142,602 A | 8/1992 | Cabato et al. | |
| 5,146,519 A | 9/1992 | Miller et al. | |
| 5,155,900 A | 10/1992 | Grois et al. | |
| 5,162,397 A | 11/1992 | Descamps et al. | |
| 5,210,810 A | 5/1993 | Darden et al. | |
| 5,212,752 A | 5/1993 | Stephenson et al. | |
| 5,224,187 A | 6/1993 | Davisdon | |
| 5,231,685 A | 7/1993 | Hanzawa et al. | |
| 5,245,683 A | 9/1993 | Belenkiy et al. | |
| 5,263,239 A | 11/1993 | Ziemek | |
| 5,276,750 A | 1/1994 | Manning | |
| 5,317,663 A | 5/1994 | Beard et al. | |
| 5,321,917 A | 6/1994 | Franklin et al. | |
| 5,375,183 A | 12/1994 | Edwards et al. | |
| 5,381,494 A | 1/1995 | O'Donnell et al. | |
| 5,390,269 A | 2/1995 | Palecek et al. | |
| 5,408,570 A | 4/1995 | Cook et al. | |
| 5,425,121 A | 6/1995 | Cooke et al. | |
| 5,452,388 A | 9/1995 | Rittle et al. | |
| 5,519,799 A | 5/1996 | Murakami et al. | |
| 5,553,186 A | 9/1996 | Allen | |
| 5,557,696 A | 9/1996 | Stein | |
| 5,569,050 A | 10/1996 | Lloyd | |
| 5,588,077 A | 12/1996 | Woodside | |
| 5,600,747 A | 2/1997 | Yamakawa et al. | |
| 5,603,631 A | 2/1997 | Kawahara et al. | |
| 5,608,828 A | 3/1997 | Coutts et al. | |
| 5,631,993 A | 5/1997 | Cloud et al. | |
| 5,647,045 A | 7/1997 | Robinson et al. | |
| 5,673,346 A | 9/1997 | Iwano et al. | |
| 5,694,507 A | 12/1997 | Walles | |
| 5,748,821 A | 5/1998 | Schempp et al. | |
| 5,761,359 A | 6/1998 | Chudoba et al. | |
| 5,781,686 A | 7/1998 | Robinson et al. | |
| 5,782,892 A | 7/1998 | Castle et al. | |
| 5,790,740 A | 8/1998 | Cloud et al. | |
| 5,791,918 A | 8/1998 | Pierce | |
| 5,796,895 A | 8/1998 | Jennings et al. | |
| RE35,935 E | 10/1998 | Cabato et al. | |
| 5,818,993 A | 10/1998 | Chudoba et al. | |
| 5,857,050 A | 1/1999 | Jiang et al. | |
| 5,862,290 A | 1/1999 | Burek et al. | |
| 5,883,999 A | 3/1999 | Cloud et al. | |
| 5,884,000 A | 3/1999 | Cloud et al. | |
| 5,884,001 A | 3/1999 | Cloud et al. | |
| 5,884,002 A | 3/1999 | Cloud et al. | |
| 5,884,003 A | 3/1999 | Cloud et al. | |
| 5,887,099 A | 3/1999 | Csipkes et al. | |
| 5,920,669 A | 7/1999 | Knecht et al. | |
| 5,925,191 A | 7/1999 | Stein et al. | |
| 5,926,596 A | 7/1999 | Edwards et al. | |
| 5,960,141 A | 9/1999 | Sasaki et al. | |
| 5,961,344 A | 10/1999 | Rosales et al. | |
| 5,971,626 A | 10/1999 | Knodell et al. | |
| RE36,592 E | 2/2000 | Giebel et al. | |
| 6,030,129 A | 2/2000 | Rosson | |
| 6,035,084 A | 3/2000 | Haake et al. | |
| 6,045,270 A | 4/2000 | Weiss et al. | |
| 6,094,517 A | 7/2000 | Yuuki | |
| 6,108,482 A | 8/2000 | Roth | |
| 6,112,006 A | 8/2000 | Foss | |
| 6,179,482 B1 | 1/2001 | Takizawa et al. | |
| 6,193,421 B1 | 2/2001 | Tamekuni et al. | |
| RE37,079 E | 3/2001 | Stephenson et al. | |
| RE37,080 E | 3/2001 | Stephenson et al. | |
| 6,200,040 B1 | 3/2001 | Edwards et al. | |
| 6,206,581 B1 | 3/2001 | Driscoll et al. | |
| 6,224,268 B1 | 5/2001 | Manning et al. | |
| 6,224,270 B1 | 5/2001 | Nakajima et al. | |
| 6,293,710 B1 | 9/2001 | Lampert et al. | |
| 6,298,190 B2 | 10/2001 | Waldron et al. | |
| 6,321,013 B1 | 11/2001 | Hardwick et al. | |
| 6,356,390 B1 | 3/2002 | Hall, Jr. | |
| 6,375,363 B1 | 4/2002 | Harrison et al. | |
| 6,404,962 B1 | 6/2002 | Hardwick et al. | |
| 6,409,391 B1 | 6/2002 | Chang | |
| 6,427,035 B1 | 7/2002 | Mahony | |
| 6,428,215 B1 | 8/2002 | Nault | |
| 6,466,725 B2 | 10/2002 | Battey et al. | |
| 6,496,641 B1 | 12/2002 | Mahony | |
| 6,522,804 B1 | 2/2003 | Mahony | |
| 6,533,468 B2 | 3/2003 | Nakajima et al. | |
| 6,536,956 B2 | 3/2003 | Luther et al. | |
| 6,542,652 B1 | 4/2003 | Mahony | |
| 6,554,489 B2 | 4/2003 | Kent et al. | |
| 6,625,375 B1 | 9/2003 | Mahony | |
| 6,629,782 B2 | 10/2003 | McPhee et al. | |
| 6,672,774 B2 | 1/2004 | Theuerkorn et al. | |
| 6,678,442 B2 | 1/2004 | Gall et al. | |
| 6,695,489 B2 | 2/2004 | Nault | |
| 6,702,475 B1 | 3/2004 | Giobbio et al. | |
| 6,738,555 B1 | 5/2004 | Cooke et al. | |
| 6,748,146 B2 | 6/2004 | Parris | |
| 6,771,861 B2 | 8/2004 | Wagner et al. | |
| 6,789,950 B1 | 9/2004 | Loder et al. | |
| 6,841,729 B2 | 1/2005 | Sakabe et al. | |
| 6,856,748 B1 | 2/2005 | Elkins et al. | |
| 6,877,906 B2 | 4/2005 | Mizukami et al. | |
| 6,880,219 B2 | 4/2005 | Griffioen et al. | |
| 6,908,233 B2 | 6/2005 | Nakajima et al. | |
| 6,916,120 B2 | 7/2005 | Zimmel et al. | |
| 6,944,387 B2 | 9/2005 | Howell et al. | |
| 6,962,445 B2 | 11/2005 | Zimmel et al. | |
| 6,970,629 B2 | 11/2005 | Lail et al. | |
| 6,983,095 B2 | 1/2006 | Reagan et al. | |
| 7,013,074 B2 | 3/2006 | Battey et al. | |
| 7,044,650 B1 | 5/2006 | Tran et al. | |
| 7,052,185 B2 | 5/2006 | Rubino et al. | |
| 7,088,899 B2 | 8/2006 | Reagan et al. | |
| 7,103,255 B2 | 9/2006 | Reagan et al. | |
| 7,103,257 B2 | 9/2006 | Donaldson et al. | |
| 7,118,283 B2 | 10/2006 | Nakajima et al. | |
| 7,118,284 B2 | 10/2006 | Nakajima et al. | |
| 7,120,347 B2 | 10/2006 | Blackwell et al. | |
| 7,146,089 B2 | 12/2006 | Reagan et al. | |
| 7,150,567 B1 | 12/2006 | Luther et al. | |
| 7,171,102 B2 | 1/2007 | Reagan et al. | |
| 7,195,403 B2 | 3/2007 | Oki et al. | |
| 7,200,317 B2 | 4/2007 | Reagan et al. | |
| 7,201,518 B2 | 4/2007 | Holmquist | |
| 7,213,975 B2 | 5/2007 | Khemakhem et al. | |
| 7,213,980 B2 | 5/2007 | Oki et al. | |
| 7,228,047 B1 | 6/2007 | Szilagyi et al. | |
| 7,232,260 B2 | 6/2007 | Takahashi et al. | |
| 7,236,670 B2 | 6/2007 | Lail et al. | |
| 7,260,301 B2 | 8/2007 | Barth et al. | |
| 7,261,472 B2 | 8/2007 | Suzuki et al. | |

(56) References Cited

U.S. PATENT DOCUMENTS

| | | |
|---|---|---|
| 7,266,265 B2 | 9/2007 | Gall et al. |
| 7,266,274 B2 | 9/2007 | Elkins et al. |
| 7,277,614 B2 | 10/2007 | Cody et al. |
| 7,279,643 B2 | 10/2007 | Morrow et al. |
| 7,292,763 B2 | 11/2007 | Smith et al. |
| 7,302,152 B2 | 11/2007 | Luther et al. |
| 7,318,677 B2 | 1/2008 | Dye |
| 7,326,091 B2 | 2/2008 | Nania et al. |
| 7,330,629 B2 | 2/2008 | Cooke et al. |
| 7,333,708 B2 | 2/2008 | Blackwell et al. |
| 7,336,873 B2 | 2/2008 | Lail et al. |
| 7,341,382 B2 | 3/2008 | Dye |
| 7,346,256 B2 | 3/2008 | Marrs et al. |
| 7,349,605 B2 | 3/2008 | Noonan et al. |
| 7,357,582 B2 | 4/2008 | Oki et al. |
| 7,366,416 B2 | 4/2008 | Ramachandran et al. |
| 7,394,964 B2 | 7/2008 | Tinucci et al. |
| 7,397,997 B2 | 7/2008 | Ferris et al. |
| 7,400,815 B2 | 7/2008 | Mertesdorf et al. |
| 7,407,332 B2 | 8/2008 | Oki et al. |
| 7,428,366 B2 | 9/2008 | Mullaney et al. |
| 7,444,056 B2 | 10/2008 | Allen et al. |
| 7,454,107 B2 | 11/2008 | Miller et al. |
| 7,463,803 B2 | 12/2008 | Cody et al. |
| 7,469,091 B2 | 12/2008 | Mullaney et al. |
| 7,477,824 B2 | 1/2009 | Reagan et al. |
| 7,480,437 B2 | 1/2009 | Ferris et al. |
| 7,484,898 B2 | 2/2009 | Katagiyama et al. |
| 7,485,804 B2 | 2/2009 | Dinh et al. |
| 7,489,849 B2 | 2/2009 | Reagan et al. |
| 7,492,996 B2 | 2/2009 | Kowalczyk et al. |
| 7,512,304 B2 | 3/2009 | Gronvall et al. |
| 7,520,678 B2 | 4/2009 | Khemakhem et al. |
| 7,539,387 B2 | 5/2009 | Mertesdorf et al. |
| 7,539,388 B2 | 5/2009 | Mertesdorf et al. |
| 7,542,645 B1 | 6/2009 | Hua et al. |
| 7,559,702 B2 | 7/2009 | Fujiwara et al. |
| 7,565,055 B2 | 7/2009 | Lu et al. |
| 7,568,845 B2 | 8/2009 | Caveney et al. |
| 7,572,065 B2 | 8/2009 | Lu et al. |
| 7,591,595 B2 | 9/2009 | Lu et al. |
| 7,614,797 B2 | 11/2009 | Lu et al. |
| 7,621,675 B1 | 11/2009 | Bradley |
| 7,627,222 B2 | 12/2009 | Reagan et al. |
| 7,628,545 B2 | 12/2009 | Cody et al. |
| 7,628,548 B2 | 12/2009 | Benjamin et al. |
| 7,646,958 B1 | 1/2010 | Reagan et al. |
| 7,653,282 B2 | 1/2010 | Blackwell et al. |
| 7,654,747 B2 | 2/2010 | Theuerkorn et al. |
| 7,654,748 B2 | 2/2010 | Kuffel et al. |
| 7,658,549 B2 | 2/2010 | Elkins et al. |
| 7,661,995 B2 | 2/2010 | Nania et al. |
| 7,677,814 B2 | 3/2010 | Lu et al. |
| 7,680,388 B2 | 3/2010 | Reagan et al. |
| 7,708,476 B2 | 5/2010 | Liu |
| 7,709,733 B1 | 5/2010 | Plankell |
| 7,712,971 B2 | 5/2010 | Lee et al. |
| 7,722,262 B2 | 5/2010 | Caveney et al. |
| 7,726,998 B2 | 6/2010 | Siebens |
| 7,738,759 B2 | 6/2010 | Parikh et al. |
| 7,740,409 B2 | 6/2010 | Bolton et al. |
| 7,742,117 B2 | 6/2010 | Lee et al. |
| 7,742,670 B2 | 6/2010 | Benjamin et al. |
| 7,744,286 B2 | 6/2010 | Lu et al. |
| 7,744,288 B2 | 6/2010 | Lu et al. |
| 7,747,117 B2 | 6/2010 | Greenwood et al. |
| 7,751,666 B2 | 7/2010 | Parsons et al. |
| 7,753,596 B2 | 7/2010 | Cox |
| 7,762,726 B2 | 7/2010 | Lu et al. |
| 7,785,019 B2 | 8/2010 | Lewallen et al. |
| 7,805,044 B2 | 9/2010 | Reagan et al. |
| 7,806,599 B2 | 10/2010 | Margolin et al. |
| 7,820,090 B2 | 10/2010 | Morrow et al. |
| 7,844,158 B2 | 11/2010 | Gronvall et al. |
| 7,844,160 B2 | 11/2010 | Reagan et al. |
| 7,869,681 B2 | 1/2011 | Battey et al. |
| RE42,094 E | 2/2011 | Barnes et al. |
| 7,881,576 B2 | 2/2011 | Melton et al. |
| 7,889,961 B2 | 2/2011 | Cote et al. |
| 7,891,882 B2 | 2/2011 | Kuffel et al. |
| 7,903,923 B2 | 3/2011 | Gronvall et al. |
| 7,903,925 B2 | 3/2011 | Cooke et al. |
| 7,933,517 B2 | 4/2011 | Ye et al. |
| 7,938,670 B2 | 5/2011 | Nania et al. |
| 7,941,027 B2 | 5/2011 | Mertesdorf et al. |
| 7,959,361 B2 | 6/2011 | Lu et al. |
| 8,002,476 B2 | 8/2011 | Caveney et al. |
| 8,005,335 B2 | 8/2011 | Reagan et al. |
| 8,023,793 B2 | 9/2011 | Kowalczyk et al. |
| 8,025,445 B2 | 9/2011 | Rambow et al. |
| 8,041,178 B2 | 10/2011 | Lu et al. |
| 8,052,333 B2 | 11/2011 | Kuffel et al. |
| 8,055,167 B2 | 11/2011 | Park et al. |
| 8,083,418 B2 | 12/2011 | Fujiwara et al. |
| 8,111,966 B2 | 2/2012 | Holmberg et al. |
| 8,137,002 B2 | 3/2012 | Lu et al. |
| 8,147,147 B2 | 4/2012 | Khemakhem et al. |
| 8,157,454 B2 | 4/2012 | Ito et al. |
| 8,164,050 B2 | 4/2012 | Ford et al. |
| 8,202,008 B2 | 6/2012 | Lu et al. |
| 8,213,761 B2 | 7/2012 | Gronvall et al. |
| 8,218,935 B2 | 7/2012 | Reagan et al. |
| 8,224,145 B2 | 7/2012 | Reagan et al. |
| 8,229,263 B2 | 7/2012 | Parris et al. |
| 8,231,282 B2 | 7/2012 | Kuffel et al. |
| 8,238,706 B2 | 8/2012 | Kachmar |
| 8,238,709 B2 | 8/2012 | Solheid et al. |
| 8,249,450 B2 | 8/2012 | Conner |
| 8,256,971 B2 | 9/2012 | Caveney et al. |
| 8,267,596 B2 | 9/2012 | Theuerkorn |
| RE43,762 E | 10/2012 | Smith et al. |
| 8,301,003 B2 | 10/2012 | De et al. |
| 8,301,004 B2 | 10/2012 | Cooke et al. |
| 8,317,411 B2 | 11/2012 | Fujiwara et al. |
| 8,348,519 B2 | 1/2013 | Kuffel et al. |
| 8,363,999 B2 | 1/2013 | Mertesdorf et al. |
| 8,376,629 B2 | 2/2013 | Cline et al. |
| 8,376,632 B2 | 2/2013 | Blackburn et al. |
| 8,402,587 B2 | 3/2013 | Sugita et al. |
| 8,408,811 B2 | 4/2013 | De et al. |
| 8,414,196 B2 | 4/2013 | Lu et al. |
| 8,466,262 B2 | 6/2013 | Siadak et al. |
| 8,472,773 B2 | 6/2013 | De Jong |
| 8,480,312 B2 | 7/2013 | Smith et al. |
| 8,494,329 B2 | 7/2013 | Nhep et al. |
| 8,496,384 B2 | 7/2013 | Kuffel et al. |
| 8,506,173 B2 | 8/2013 | Lewallen et al. |
| 8,520,996 B2 | 8/2013 | Cowen et al. |
| 8,534,928 B2 | 9/2013 | Cooke et al. |
| 8,536,516 B2 | 9/2013 | Ford et al. |
| 8,556,522 B2 | 10/2013 | Cunningham |
| 8,573,855 B2 | 11/2013 | Nhep |
| 8,591,124 B2 | 11/2013 | Griffiths et al. |
| 8,622,627 B2 | 1/2014 | Elkins et al. |
| 8,622,634 B2 | 1/2014 | Arnold et al. |
| 8,635,733 B2 | 1/2014 | Bardzilowski |
| 8,662,760 B2 | 3/2014 | Cline et al. |
| 8,668,512 B2 | 3/2014 | Chang |
| 8,678,668 B2 | 3/2014 | Cooke et al. |
| 8,687,930 B2 | 4/2014 | McDowell et al. |
| 8,702,324 B2 | 4/2014 | Caveney et al. |
| 8,714,835 B2 | 5/2014 | Kuffel et al. |
| 8,727,638 B2 | 5/2014 | Lee et al. |
| 8,737,837 B2 | 5/2014 | Conner et al. |
| 8,755,663 B2 | 6/2014 | Makrides-Saravanos et al. |
| 8,758,046 B2 | 6/2014 | Pezzetti et al. |
| 8,770,861 B2 | 7/2014 | Smith et al. |
| 8,770,862 B2 | 7/2014 | Lu et al. |
| 8,837,894 B2 | 9/2014 | Holmberg et al. |
| 8,864,390 B2 | 10/2014 | Chen et al. |
| 8,870,469 B2 | 10/2014 | Kachmar |
| 8,879,883 B2 | 11/2014 | Parikh et al. |
| 8,882,364 B2 | 11/2014 | Busse et al. |
| 8,917,966 B2 | 12/2014 | Thompson et al. |

(56) References Cited

U.S. PATENT DOCUMENTS

| | | |
|---|---|---|
| 8,974,124 B2 | 3/2015 | Chang |
| 8,992,097 B2 | 3/2015 | Koreeda et al. |
| 8,998,502 B2 | 4/2015 | Benjamin et al. |
| 8,998,506 B2 | 4/2015 | Pepin et al. |
| 9,011,858 B2 | 4/2015 | Siadak et al. |
| 9,039,293 B2 | 5/2015 | Hill et al. |
| 9,075,205 B2 | 7/2015 | Pepe et al. |
| 9,146,364 B2 | 9/2015 | Chen et al. |
| 9,151,906 B2 | 10/2015 | Kobayashi et al. |
| 9,151,909 B2 | 10/2015 | Chen et al. |
| 9,158,074 B2 | 10/2015 | Anderson et al. |
| 9,158,075 B2 | 10/2015 | Benjamin et al. |
| 9,182,567 B2 | 11/2015 | Mullaney |
| 9,188,759 B2 | 11/2015 | Conner |
| 9,207,410 B2 | 12/2015 | Lee et al. |
| 9,207,421 B2 | 12/2015 | Conner |
| 9,213,150 B2 | 12/2015 | Matsui et al. |
| 9,223,106 B2 | 12/2015 | Coan et al. |
| 9,239,441 B2 | 1/2016 | Melton et al. |
| 9,268,102 B2 | 2/2016 | Daems et al. |
| 9,274,286 B2 | 3/2016 | Caveney et al. |
| 9,279,951 B2 | 3/2016 | McGranahan et al. |
| 9,285,550 B2 | 3/2016 | Nhep et al. |
| 9,297,974 B2 | 3/2016 | Valderrabano et al. |
| 9,297,976 B2 | 3/2016 | Hill et al. |
| 9,310,570 B2 | 4/2016 | Busse et al. |
| 9,316,791 B2 | 4/2016 | Durrant et al. |
| 9,322,998 B2 | 4/2016 | Miller |
| 9,360,640 B2 | 6/2016 | Ishigami et al. |
| 9,383,539 B2 | 7/2016 | Hill et al. |
| 9,400,364 B2 | 7/2016 | Hill et al. |
| 9,405,068 B2 | 8/2016 | Graham et al. |
| 9,417,403 B2 | 8/2016 | Mullaney et al. |
| 9,423,584 B2 | 8/2016 | Coan et al. |
| 9,435,969 B2 | 9/2016 | Lambourn et al. |
| 9,442,257 B2 | 9/2016 | Lu |
| 9,450,393 B2 | 9/2016 | Thompson et al. |
| 9,459,412 B2 | 10/2016 | Katoh |
| 9,482,819 B2 | 11/2016 | Li et al. |
| 9,482,829 B2 | 11/2016 | Lu et al. |
| 9,513,451 B2 | 12/2016 | Corbille et al. |
| 9,535,229 B2 | 1/2017 | Ott et al. |
| 9,541,711 B2 | 1/2017 | Raven et al. |
| 9,557,504 B2 | 1/2017 | Holmberg et al. |
| 9,581,775 B2 | 2/2017 | Kondo et al. |
| 9,588,304 B2 | 3/2017 | Durrant et al. |
| 9,612,407 B2 | 4/2017 | Kobayashi et al. |
| 9,618,704 B2 | 4/2017 | Dean et al. |
| 9,618,718 B2 | 4/2017 | Islam |
| 9,624,296 B2 | 4/2017 | Siadak et al. |
| 9,625,660 B2 | 4/2017 | Daems et al. |
| 9,638,871 B2 | 5/2017 | Bund et al. |
| 9,645,331 B1 | 5/2017 | Kim |
| 9,645,334 B2 | 5/2017 | Ishii et al. |
| 9,651,741 B2 | 5/2017 | Isenhour et al. |
| 9,664,862 B2 | 5/2017 | Lu et al. |
| 9,678,285 B2 | 6/2017 | Hill et al. |
| 9,678,293 B2 | 6/2017 | Coan et al. |
| 9,684,136 B2 | 6/2017 | Cline et al. |
| 9,684,138 B2 | 6/2017 | Lu |
| 9,696,500 B2 | 7/2017 | Barnette et al. |
| 9,711,868 B2 | 7/2017 | Scheucher |
| 9,720,193 B2 | 8/2017 | Nishimura |
| 9,733,436 B2 | 8/2017 | Van et al. |
| 9,739,951 B2 | 8/2017 | Busse et al. |
| 9,762,322 B1 | 9/2017 | Amundson |
| 9,766,416 B1 | 9/2017 | Kim |
| 9,772,457 B2 | 9/2017 | Hill et al. |
| 9,804,343 B2 | 10/2017 | Hill et al. |
| 9,810,855 B2 | 11/2017 | Cox et al. |
| 9,810,856 B2 | 11/2017 | Graham et al. |
| 9,829,658 B2 | 11/2017 | Nishimura |
| 9,829,668 B2 | 11/2017 | Coenegracht et al. |
| 9,851,522 B2 | 12/2017 | Reagan et al. |
| 9,857,540 B2 | 1/2018 | Ahmed et al. |
| 9,864,151 B2 | 1/2018 | Lu |
| 9,878,038 B2 | 1/2018 | Siadak et al. |
| 9,885,841 B2 | 2/2018 | Pepe et al. |
| 9,891,391 B2 | 2/2018 | Watanabe |
| 9,905,933 B2 | 2/2018 | Scheucher |
| 9,910,236 B2 | 3/2018 | Cooke et al. |
| 9,921,375 B2 | 3/2018 | Compton et al. |
| 9,927,580 B2 | 3/2018 | Bretz et al. |
| 9,933,582 B1 | 4/2018 | Lin |
| 9,939,591 B2 | 4/2018 | Mullaney et al. |
| 9,964,713 B2 | 5/2018 | Barnette et al. |
| 9,964,715 B2 | 5/2018 | Lu |
| 9,977,194 B2 | 5/2018 | Waldron et al. |
| 9,977,198 B2 | 5/2018 | Bund et al. |
| 9,983,374 B2 | 5/2018 | Li et al. |
| 10,007,068 B2 | 6/2018 | Hill et al. |
| 10,031,302 B2 | 7/2018 | Ji et al. |
| 10,036,859 B2 | 7/2018 | Daems et al. |
| 10,038,946 B2 | 7/2018 | Smolorz |
| 10,042,136 B2 | 8/2018 | Reagan et al. |
| 10,061,090 B2 | 8/2018 | Coenegracht |
| 10,073,224 B2 | 9/2018 | Tong et al. |
| 10,094,986 B2 | 10/2018 | Barnette et al. |
| 10,101,538 B2 | 10/2018 | Lu et al. |
| 10,107,968 B2 | 10/2018 | Tong et al. |
| 10,109,927 B2 | 10/2018 | Scheucher |
| 10,114,176 B2 | 10/2018 | Gimblet et al. |
| 10,126,508 B2 | 11/2018 | Compton et al. |
| 10,180,541 B2 | 1/2019 | Coenegracht et al. |
| 10,209,454 B2 | 2/2019 | Isenhour et al. |
| 10,215,930 B2 | 2/2019 | Mullaney et al. |
| 10,235,184 B2 | 3/2019 | Walker |
| 10,261,268 B2 | 4/2019 | Theuerkorn |
| 10,268,011 B2 | 4/2019 | Courchaine et al. |
| 10,288,820 B2 | 5/2019 | Coenegracht |
| 10,317,628 B2 | 6/2019 | Van et al. |
| 10,324,263 B2 | 6/2019 | Bund et al. |
| 10,338,323 B2 | 7/2019 | Lu et al. |
| 10,353,154 B2 | 7/2019 | Ott et al. |
| 10,353,156 B2 | 7/2019 | Hill et al. |
| 10,359,577 B2 | 7/2019 | Dannoux et al. |
| 10,371,914 B2 | 8/2019 | Coan et al. |
| 10,379,298 B2 | 8/2019 | Dannoux et al. |
| 10,386,584 B2 | 8/2019 | Rosson |
| 10,401,575 B2 | 9/2019 | Daily et al. |
| 10,401,578 B2 | 9/2019 | Coenegracht |
| 10,401,584 B2 | 9/2019 | Coan et al. |
| 10,409,007 B2 | 9/2019 | Kadar-Kallen et al. |
| 10,422,962 B2 | 9/2019 | Coenegracht |
| 10,422,970 B2 | 9/2019 | Holmberg et al. |
| 10,429,593 B2 | 10/2019 | Baca et al. |
| 10,429,594 B2 | 10/2019 | Dannoux et al. |
| 10,434,173 B2 | 10/2019 | Siadak et al. |
| 10,439,295 B2 | 10/2019 | Scheucher |
| 10,444,442 B2 | 10/2019 | Takano et al. |
| 10,451,811 B2 | 10/2019 | Coenegracht et al. |
| 10,451,817 B2 | 10/2019 | Lu |
| 10,451,830 B2 | 10/2019 | Szumacher et al. |
| 10,488,597 B2 | 11/2019 | Parikh et al. |
| 10,495,822 B2 | 12/2019 | Nhep |
| 10,502,916 B2 | 12/2019 | Coan et al. |
| 10,520,683 B2 | 12/2019 | Nhep |
| 10,539,745 B2 | 1/2020 | Kamada et al. |
| 10,578,821 B2 | 3/2020 | Ott et al. |
| 10,585,246 B2 | 3/2020 | Bretz et al. |
| 10,591,678 B2 | 3/2020 | Mullaney et al. |
| 10,605,998 B2 | 3/2020 | Rosson |
| 10,606,006 B2 | 3/2020 | Hill et al. |
| 10,613,278 B2 | 4/2020 | Kempeneers et al. |
| 10,620,388 B2 | 4/2020 | Isenhour et al. |
| 10,656,347 B2 | 5/2020 | Kato |
| 10,677,998 B2 | 6/2020 | Van et al. |
| 10,680,343 B2 | 6/2020 | Scheucher |
| 10,712,516 B2 | 7/2020 | Courchaine et al. |
| 10,739,534 B2 | 8/2020 | Murray et al. |
| 10,746,939 B2 | 8/2020 | Lu et al. |
| 10,761,274 B2 | 9/2020 | Pepe et al. |
| 10,782,487 B2 | 9/2020 | Lu |
| 10,802,236 B2 | 10/2020 | Kowalczyk et al. |

(56) References Cited

U.S. PATENT DOCUMENTS

| | | |
|---|---|---|
| 10,830,967 B2 | 11/2020 | Pimentel et al. |
| 10,830,975 B2 | 11/2020 | Vaughn et al. |
| 10,852,498 B2 | 12/2020 | Hill et al. |
| 10,852,499 B2 | 12/2020 | Cooke et al. |
| 10,859,771 B2 | 12/2020 | Nhep |
| 10,859,781 B2 | 12/2020 | Hill et al. |
| 10,962,731 B2 | 3/2021 | Coenegracht |
| 10,976,500 B2 | 4/2021 | Ott et al. |
| 11,061,191 B2 | 7/2021 | Van Baelen et al. |
| 11,290,188 B2 | 3/2022 | Tuccio et al. |
| 2001/0002220 A1 | 5/2001 | Throckmorton et al. |
| 2001/0012428 A1 | 8/2001 | Nakajima et al. |
| 2002/0012502 A1 | 1/2002 | Farrar et al. |
| 2002/0064364 A1 | 5/2002 | Battey et al. |
| 2002/0076165 A1 | 6/2002 | Childers et al. |
| 2002/0079697 A1 | 6/2002 | Griffioen et al. |
| 2002/0081077 A1 | 6/2002 | Nault |
| 2002/0122634 A1 | 9/2002 | Miyake et al. |
| 2002/0131721 A1 | 9/2002 | Gaio et al. |
| 2002/0159745 A1 | 10/2002 | Howell et al. |
| 2002/0172477 A1 | 11/2002 | Quinn et al. |
| 2003/0016440 A1 | 1/2003 | Zeidan et al. |
| 2003/0031447 A1 | 2/2003 | Nault |
| 2003/0059181 A1 | 3/2003 | Jackman et al. |
| 2003/0063866 A1 | 4/2003 | Melton et al. |
| 2003/0080555 A1 | 5/2003 | Griffioen et al. |
| 2003/0086664 A1 | 5/2003 | Moisel et al. |
| 2003/0123813 A1 | 7/2003 | Ravasio et al. |
| 2003/0128936 A1 | 7/2003 | Fahrnbauer et al. |
| 2003/0165311 A1 | 9/2003 | Wagman et al. |
| 2003/0201117 A1 | 10/2003 | Sakabe et al. |
| 2003/0206705 A1 | 11/2003 | McAlpine et al. |
| 2003/0210875 A1 | 11/2003 | Wagner et al. |
| 2004/0057676 A1 | 3/2004 | Doss et al. |
| 2004/0057681 A1 | 3/2004 | Quinn et al. |
| 2004/0072454 A1 | 4/2004 | Nakajima et al. |
| 2004/0076377 A1 | 4/2004 | Mizukami et al. |
| 2004/0076386 A1 | 4/2004 | Nechitailo |
| 2004/0086238 A1 | 5/2004 | Finona et al. |
| 2004/0096162 A1 | 5/2004 | Kocher et al. |
| 2004/0157499 A1 | 8/2004 | Nania et al. |
| 2004/0206542 A1 | 10/2004 | Gladd et al. |
| 2004/0240808 A1 | 12/2004 | Rhoney et al. |
| 2004/0247251 A1 | 12/2004 | Rubino et al. |
| 2004/0252954 A1 | 12/2004 | Ginocchio et al. |
| 2004/0262023 A1 | 12/2004 | Morrow et al. |
| 2005/0019031 A1 | 1/2005 | Ye et al. |
| 2005/0036744 A1 | 2/2005 | Caveney et al. |
| 2005/0036786 A1 | 2/2005 | Ramachandran et al. |
| 2005/0053342 A1 | 3/2005 | Melton et al. |
| 2005/0084215 A1 | 4/2005 | Grzegorzewska et al. |
| 2005/0105873 A1 | 5/2005 | Reagan et al. |
| 2005/0123422 A1 | 6/2005 | Lilie |
| 2005/0129379 A1 | 6/2005 | Reagan et al. |
| 2005/0163448 A1 | 7/2005 | Blackwell et al. |
| 2005/0175307 A1 | 8/2005 | Battey et al. |
| 2005/0180697 A1 | 8/2005 | De Marchi |
| 2005/0213890 A1 | 9/2005 | Barnes et al. |
| 2005/0213892 A1 | 9/2005 | Barnes et al. |
| 2005/0213899 A1 | 9/2005 | Hurley et al. |
| 2005/0213902 A1 | 9/2005 | Parsons |
| 2005/0213921 A1 | 9/2005 | Mertesdorf et al. |
| 2005/0226568 A1 | 10/2005 | Nakajima et al. |
| 2005/0232550 A1 | 10/2005 | Nakajima et al. |
| 2005/0232552 A1 | 10/2005 | Takahashi et al. |
| 2005/0232567 A1 | 10/2005 | Reagan et al. |
| 2005/0244108 A1 | 11/2005 | Billman et al. |
| 2005/0271344 A1 | 12/2005 | Grubish et al. |
| 2005/0281510 A1 | 12/2005 | Vo et al. |
| 2005/0281514 A1 | 12/2005 | Oki et al. |
| 2005/0286837 A1 | 12/2005 | Oki et al. |
| 2005/0286838 A1 | 12/2005 | Oki et al. |
| 2006/0002668 A1 | 1/2006 | Ail et al. |
| 2006/0008232 A1 | 1/2006 | Reagan et al. |
| 2006/0008233 A1 | 1/2006 | Reagan et al. |
| 2006/0008234 A1 | 1/2006 | Reagan et al. |
| 2006/0045428 A1 | 3/2006 | Theuerkorn et al. |
| 2006/0045430 A1 | 3/2006 | Theuerkorn et al. |
| 2006/0056769 A1 | 3/2006 | Khemakhem et al. |
| 2006/0056770 A1 | 3/2006 | Schmitz |
| 2006/0088247 A1 | 4/2006 | Tran et al. |
| 2006/0093278 A1 | 5/2006 | Elkins et al. |
| 2006/0093303 A1 | 5/2006 | Reagan et al. |
| 2006/0093304 A1 | 5/2006 | Battey et al. |
| 2006/0098932 A1 | 5/2006 | Battey et al. |
| 2006/0120672 A1 | 6/2006 | Cody et al. |
| 2006/0127016 A1 | 6/2006 | Baird et al. |
| 2006/0133748 A1 | 6/2006 | Seddon et al. |
| 2006/0133758 A1 | 6/2006 | Mullaney et al. |
| 2006/0133759 A1 | 6/2006 | Mullaney et al. |
| 2006/0147172 A1 | 7/2006 | Luther et al. |
| 2006/0153503 A1 | 7/2006 | Suzuki et al. |
| 2006/0153517 A1 | 7/2006 | Reagan et al. |
| 2006/0165352 A1 | 7/2006 | Caveney et al. |
| 2006/0171638 A1 | 8/2006 | Dye |
| 2006/0171640 A1 | 8/2006 | Dye |
| 2006/0210750 A1 | 9/2006 | Morrow et al. |
| 2006/0233506 A1 | 10/2006 | Noonan et al. |
| 2006/0257092 A1 | 11/2006 | Lu et al. |
| 2006/0269204 A1 | 11/2006 | Barth et al. |
| 2006/0269208 A1 | 11/2006 | Allen et al. |
| 2006/0280420 A1 | 12/2006 | Blackwell et al. |
| 2007/0031100 A1 | 2/2007 | Garcia et al. |
| 2007/0036483 A1 | 2/2007 | Shin et al. |
| 2007/0041732 A1 | 2/2007 | Oki et al. |
| 2007/0047897 A1 | 3/2007 | Cooke et al. |
| 2007/0110374 A1 | 5/2007 | Oki et al. |
| 2007/0116413 A1 | 5/2007 | Cox |
| 2007/0127872 A1 | 6/2007 | Caveney et al. |
| 2007/0140642 A1 | 6/2007 | Mertesdorf et al. |
| 2007/0160327 A1 | 7/2007 | Lewallen et al. |
| 2007/0237484 A1 | 10/2007 | Reagan et al. |
| 2007/0263961 A1 | 11/2007 | Khemakhem et al. |
| 2007/0286554 A1 | 12/2007 | Kuffel et al. |
| 2008/0019641 A1 | 1/2008 | Elkins et al. |
| 2008/0020532 A1 | 1/2008 | Monfray et al. |
| 2008/0044145 A1 | 2/2008 | Jenkins et al. |
| 2008/0069511 A1 | 3/2008 | Blackwell et al. |
| 2008/0080817 A1 | 4/2008 | Melton et al. |
| 2008/0112681 A1 | 5/2008 | Battey et al. |
| 2008/0131068 A1 | 6/2008 | Mertesdorf et al. |
| 2008/0138016 A1 | 6/2008 | Katagiyama et al. |
| 2008/0138025 A1 | 6/2008 | Reagan et al. |
| 2008/0166906 A1 | 7/2008 | Nania et al. |
| 2008/0175541 A1 | 7/2008 | Lu et al. |
| 2008/0175542 A1 | 7/2008 | Lu et al. |
| 2008/0175544 A1 | 7/2008 | Fujiwara et al. |
| 2008/0175548 A1 | 7/2008 | Knecht et al. |
| 2008/0226252 A1 | 9/2008 | Mertesdorf et al. |
| 2008/0232743 A1 | 9/2008 | Gronvall et al. |
| 2008/0260344 A1 | 10/2008 | Smith et al. |
| 2008/0260345 A1 | 10/2008 | Mertesdorf et al. |
| 2008/0264664 A1 | 10/2008 | Dinh et al. |
| 2008/0273837 A1 | 11/2008 | Margolin et al. |
| 2009/0003772 A1 | 1/2009 | Lu et al. |
| 2009/0034923 A1 | 2/2009 | Miller et al. |
| 2009/0041411 A1 | 2/2009 | Melton et al. |
| 2009/0060421 A1 | 3/2009 | Parikh et al. |
| 2009/0060423 A1 | 3/2009 | Melton et al. |
| 2009/0067791 A1 | 3/2009 | Greenwood et al. |
| 2009/0067849 A1 | 3/2009 | Oki et al. |
| 2009/0074363 A1 | 3/2009 | Parsons et al. |
| 2009/0074369 A1 | 3/2009 | Bolton et al. |
| 2009/0123115 A1 | 5/2009 | Gronvall et al. |
| 2009/0129729 A1 | 5/2009 | Caveney et al. |
| 2009/0148101 A1 | 6/2009 | Lu et al. |
| 2009/0148102 A1 | 6/2009 | Lu et al. |
| 2009/0148103 A1 | 6/2009 | Lu et al. |
| 2009/0148104 A1 | 6/2009 | Lu et al. |
| 2009/0148118 A1 | 6/2009 | Gronvall et al. |
| 2009/0148120 A1 | 6/2009 | Reagan et al. |
| 2009/0162016 A1 | 6/2009 | Lu et al. |
| 2009/0185835 A1 | 7/2009 | Park et al. |
| 2009/0190895 A1 | 7/2009 | Reagan et al. |

(56) References Cited

U.S. PATENT DOCUMENTS

| | | |
|---|---|---|
| 2009/0238531 A1 | 9/2009 | Holmberg et al. |
| 2009/0245737 A1 | 10/2009 | Fujiwara et al. |
| 2009/0245743 A1 | 10/2009 | Cote et al. |
| 2009/0263097 A1 | 10/2009 | Solheid et al. |
| 2009/0297112 A1 | 12/2009 | Mertesdorf et al. |
| 2009/0317039 A1 | 12/2009 | Blazer et al. |
| 2009/0317045 A1 | 12/2009 | Reagan et al. |
| 2010/0008909 A1 | 1/2010 | Siadak et al. |
| 2010/0014813 A1 | 1/2010 | Ito et al. |
| 2010/0014824 A1 | 1/2010 | Lu et al. |
| 2010/0014867 A1 | 1/2010 | Ramanitra et al. |
| 2010/0015834 A1 | 1/2010 | Siebens |
| 2010/0021254 A1 | 1/2010 | Jenkins et al. |
| 2010/0034502 A1 | 2/2010 | Lu et al. |
| 2010/0040331 A1 | 2/2010 | Khemakhem et al. |
| 2010/0040338 A1 | 2/2010 | Sek |
| 2010/0061685 A1 | 3/2010 | Kowalczyk et al. |
| 2010/0074578 A1 | 3/2010 | Imaizumi et al. |
| 2010/0080516 A1 | 4/2010 | Coleman et al. |
| 2010/0086260 A1 | 4/2010 | Parikh et al. |
| 2010/0086267 A1 | 4/2010 | Cooke et al. |
| 2010/0092129 A1 | 4/2010 | Conner |
| 2010/0092133 A1 | 4/2010 | Conner |
| 2010/0092136 A1 | 4/2010 | Nhep |
| 2010/0092146 A1 | 4/2010 | Conner et al. |
| 2010/0092169 A1 | 4/2010 | Conner et al. |
| 2010/0092171 A1 | 4/2010 | Conner |
| 2010/0129034 A1 | 5/2010 | Kuffel et al. |
| 2010/0144183 A1 | 6/2010 | Nania et al. |
| 2010/0172616 A1 | 7/2010 | Lu et al. |
| 2010/0197222 A1 | 8/2010 | Scheucher |
| 2010/0215321 A1 | 8/2010 | Jenkins |
| 2010/0220962 A1 | 9/2010 | Caveney et al. |
| 2010/0226615 A1 | 9/2010 | Reagan et al. |
| 2010/0232753 A1 | 9/2010 | Parris et al. |
| 2010/0247053 A1 | 9/2010 | Cowen et al. |
| 2010/0266242 A1 | 10/2010 | Lu et al. |
| 2010/0266244 A1 | 10/2010 | Lu et al. |
| 2010/0266245 A1 | 10/2010 | Sabo |
| 2010/0272399 A1 | 10/2010 | Griffiths et al. |
| 2010/0284662 A1 | 11/2010 | Reagan et al. |
| 2010/0290741 A1 | 11/2010 | Lu et al. |
| 2010/0303426 A1 | 12/2010 | Davis |
| 2010/0303427 A1 | 12/2010 | Rambow et al. |
| 2010/0310213 A1 | 12/2010 | Lewallen et al. |
| 2010/0322563 A1 | 12/2010 | Melton et al. |
| 2010/0329625 A1 | 12/2010 | Reagan et al. |
| 2011/0019964 A1 | 1/2011 | Nhep et al. |
| 2011/0047731 A1 | 3/2011 | Sugita et al. |
| 2011/0067452 A1 | 3/2011 | Gronvall et al. |
| 2011/0069932 A1 | 3/2011 | Overton et al. |
| 2011/0108719 A1 | 5/2011 | Ford et al. |
| 2011/0116749 A1 | 5/2011 | Kuffel et al. |
| 2011/0123166 A1 | 5/2011 | Reagan et al. |
| 2011/0129186 A1 | 6/2011 | Lewallen et al. |
| 2011/0164854 A1 | 7/2011 | Desard et al. |
| 2011/0262099 A1 | 10/2011 | Castonguay et al. |
| 2011/0262100 A1 | 10/2011 | Reagan et al. |
| 2011/0299814 A1 | 12/2011 | Nakagawa |
| 2011/0305421 A1 | 12/2011 | Caveney et al. |
| 2012/0008909 A1 | 1/2012 | Mertesdorf et al. |
| 2012/0045179 A1 | 2/2012 | Theuerkorn |
| 2012/0063724 A1 | 3/2012 | Kuffel et al. |
| 2012/0063729 A1 | 3/2012 | Fujiwara et al. |
| 2012/0106912 A1 | 5/2012 | McGranahan et al. |
| 2012/0106913 A1 | 5/2012 | Makrides-Saravanos et al. |
| 2012/0134629 A1 | 5/2012 | Lu et al. |
| 2012/0183268 A1 | 7/2012 | De et al. |
| 2012/0213478 A1 | 8/2012 | Chen et al. |
| 2012/0251060 A1 | 10/2012 | Hurley |
| 2012/0251063 A1 | 10/2012 | Reagan et al. |
| 2012/0252244 A1 | 10/2012 | Elkins et al. |
| 2012/0275749 A1 | 11/2012 | Kuffel et al. |
| 2012/0321256 A1 | 12/2012 | Caveney et al. |
| 2013/0004122 A1 | 1/2013 | Kingsbury |
| 2013/0020480 A1 | 1/2013 | Ford et al. |
| 2013/0034333 A1 | 2/2013 | Holmberg et al. |
| 2013/0064506 A1 | 3/2013 | Eberle et al. |
| 2013/0094821 A1 | 4/2013 | Logan |
| 2013/0109213 A1 | 5/2013 | Chang |
| 2013/0114930 A1 | 5/2013 | Smith et al. |
| 2013/0136402 A1 | 5/2013 | Kuffel et al. |
| 2013/0170834 A1 | 7/2013 | Cho et al. |
| 2013/0209099 A1 | 8/2013 | Reagan et al. |
| 2013/0236139 A1 | 9/2013 | Chen et al. |
| 2013/0266562 A1 | 10/2013 | Siadak et al. |
| 2013/0315538 A1 | 11/2013 | Kuffel et al. |
| 2014/0016902 A1 | 1/2014 | Pepe et al. |
| 2014/0056561 A1 | 2/2014 | Lu et al. |
| 2014/0079356 A1 | 3/2014 | Pepin et al. |
| 2014/0133804 A1 | 5/2014 | Lu et al. |
| 2014/0133806 A1 | 5/2014 | Hill et al. |
| 2014/0133807 A1 | 5/2014 | Katoh |
| 2014/0133808 A1 | 5/2014 | Hill et al. |
| 2014/0153876 A1 | 6/2014 | Dendas et al. |
| 2014/0153878 A1 | 6/2014 | Mullaney |
| 2014/0161397 A1 | 6/2014 | Gallegos et al. |
| 2014/0205257 A1 | 7/2014 | Durrant et al. |
| 2014/0219609 A1 | 8/2014 | Nielson et al. |
| 2014/0219622 A1 | 8/2014 | Coan et al. |
| 2014/0233896 A1 | 8/2014 | Ishigami et al. |
| 2014/0241670 A1 | 8/2014 | Barnette et al. |
| 2014/0241671 A1 | 8/2014 | Koreeda et al. |
| 2014/0241689 A1 | 8/2014 | Bradley et al. |
| 2014/0254987 A1 | 9/2014 | Caveney et al. |
| 2014/0294395 A1 | 10/2014 | Waldron et al. |
| 2014/0314379 A1 | 10/2014 | Lu et al. |
| 2014/0328559 A1 | 11/2014 | Kobayashi et al. |
| 2014/0341511 A1 | 11/2014 | Daems et al. |
| 2014/0348467 A1 | 11/2014 | Cote et al. |
| 2014/0355936 A1 | 12/2014 | Bund et al. |
| 2015/0003787 A1 | 1/2015 | Chen et al. |
| 2015/0003788 A1 | 1/2015 | Chen et al. |
| 2015/0036982 A1 | 2/2015 | Nhep et al. |
| 2015/0110451 A1 | 4/2015 | Blazer et al. |
| 2015/0153532 A1 | 6/2015 | Holmberg et al. |
| 2015/0168657 A1 | 6/2015 | Islam |
| 2015/0183869 A1 | 7/2015 | Siadak et al. |
| 2015/0185423 A1 | 7/2015 | Matsui et al. |
| 2015/0253527 A1 | 9/2015 | Hill et al. |
| 2015/0253528 A1 | 9/2015 | Corbille et al. |
| 2015/0268423 A1 | 9/2015 | Burkholder et al. |
| 2015/0268434 A1 | 9/2015 | Barnette et al. |
| 2015/0293310 A1 | 10/2015 | Kanno |
| 2015/0309274 A1 | 10/2015 | Hurley et al. |
| 2015/0316727 A1 | 11/2015 | Kondo et al. |
| 2015/0346435 A1 | 12/2015 | Kato |
| 2015/0346436 A1 | 12/2015 | Pepe et al. |
| 2016/0015885 A1 | 1/2016 | Pananen et al. |
| 2016/0041346 A1 | 2/2016 | Barnette et al. |
| 2016/0062053 A1 | 3/2016 | Mullaney |
| 2016/0085032 A1 | 3/2016 | Lu et al. |
| 2016/0109671 A1 | 4/2016 | Coan et al. |
| 2016/0116686 A1 | 4/2016 | Durrant et al. |
| 2016/0126667 A1 | 5/2016 | Droesbeke et al. |
| 2016/0131851 A1 | 5/2016 | Theuerkorn |
| 2016/0131857 A1 | 5/2016 | Pimentel et al. |
| 2016/0139346 A1 | 5/2016 | Bund et al. |
| 2016/0154184 A1 | 6/2016 | Bund et al. |
| 2016/0161682 A1 | 6/2016 | Nishimura |
| 2016/0161688 A1 | 6/2016 | Nishimura |
| 2016/0161689 A1 | 6/2016 | Nishimura |
| 2016/0187590 A1 | 6/2016 | Lu |
| 2016/0202431 A1 | 7/2016 | Hill et al. |
| 2016/0209599 A1 | 7/2016 | Van et al. |
| 2016/0209602 A1 | 7/2016 | Theuerkorn |
| 2016/0216468 A1 | 7/2016 | Gimblet et al. |
| 2016/0238810 A1 | 8/2016 | Hubbard et al. |
| 2016/0246019 A1 | 8/2016 | Ishii et al. |
| 2016/0259133 A1 | 9/2016 | Kobayashi et al. |
| 2016/0259134 A1 | 9/2016 | Daems et al. |
| 2016/0306122 A1 | 10/2016 | Tong et al. |
| 2016/0327754 A1 | 11/2016 | Hill et al. |
| 2017/0023758 A1 | 1/2017 | Reagan et al. |

(56) References Cited

U.S. PATENT DOCUMENTS

| | | |
|---|---|---|
| 2017/0045699 A1 | 2/2017 | Coan et al. |
| 2017/0052325 A1 | 2/2017 | Mullaney et al. |
| 2017/0123163 A1 | 5/2017 | Lu et al. |
| 2017/0123165 A1 | 5/2017 | Barnette et al. |
| 2017/0131509 A1 | 5/2017 | Xiao et al. |
| 2017/0139158 A1 | 5/2017 | Coenegracht |
| 2017/0168248 A1 | 6/2017 | Hayauchi et al. |
| 2017/0168256 A1 | 6/2017 | Reagan et al. |
| 2017/0170596 A1 | 6/2017 | Goossens et al. |
| 2017/0176252 A1 | 6/2017 | Marple et al. |
| 2017/0176690 A1 | 6/2017 | Bretz et al. |
| 2017/0182160 A1 | 6/2017 | Siadak et al. |
| 2017/0219782 A1 | 8/2017 | Nishimura |
| 2017/0235067 A1 | 8/2017 | Holmberg et al. |
| 2017/0238822 A1 | 8/2017 | Young et al. |
| 2017/0254961 A1 | 9/2017 | Kamada et al. |
| 2017/0254962 A1 | 9/2017 | Mueller-Schlomka et al. |
| 2017/0261696 A1 | 9/2017 | Compton et al. |
| 2017/0261698 A1 | 9/2017 | Compton et al. |
| 2017/0261699 A1 | 9/2017 | Compton et al. |
| 2017/0285275 A1 | 10/2017 | Hill et al. |
| 2017/0288315 A1 | 10/2017 | Scheucher |
| 2017/0293091 A1 | 10/2017 | Lu et al. |
| 2017/0336587 A1 | 11/2017 | Coan et al. |
| 2017/0343741 A1 | 11/2017 | Coenegracht et al. |
| 2017/0343745 A1 | 11/2017 | Rosson |
| 2017/0351037 A1 | 12/2017 | Watanabe et al. |
| 2018/0031774 A1 | 2/2018 | Van et al. |
| 2018/0081127 A1 | 3/2018 | Coenegracht |
| 2018/0143386 A1 | 5/2018 | Coan et al. |
| 2018/0151960 A1 | 5/2018 | Scheucher |
| 2018/0180831 A1 | 6/2018 | Blazer et al. |
| 2018/0224610 A1 | 8/2018 | Pimentel et al. |
| 2018/0239094 A1 | 8/2018 | Barnette et al. |
| 2018/0246283 A1 | 8/2018 | Pepe et al. |
| 2018/0259721 A1 | 9/2018 | Bund et al. |
| 2018/0329149 A1 | 11/2018 | Mullaney et al. |
| 2018/0372962 A1 | 12/2018 | Isenhour et al. |
| 2019/0004251 A1 | 1/2019 | Dannoux et al. |
| 2019/0004255 A1 | 1/2019 | Dannoux et al. |
| 2019/0004256 A1 | 1/2019 | Rosson |
| 2019/0004258 A1 | 1/2019 | Dannoux et al. |
| 2019/0011641 A1 | 1/2019 | Isenhour et al. |
| 2019/0018210 A1 | 1/2019 | Coan et al. |
| 2019/0033532 A1 | 1/2019 | Gimblet et al. |
| 2019/0038743 A1 | 2/2019 | Siadak et al. |
| 2019/0041584 A1 | 2/2019 | Coenegracht et al. |
| 2019/0041585 A1 | 2/2019 | Bretz et al. |
| 2019/0041595 A1 | 2/2019 | Reagan et al. |
| 2019/0058259 A1 | 2/2019 | Scheucher |
| 2019/0107677 A1 | 4/2019 | Coenegracht et al. |
| 2019/0147202 A1 | 5/2019 | Harney |
| 2019/0162910 A1 | 5/2019 | Gurreri |
| 2019/0162914 A1 | 5/2019 | Baca et al. |
| 2019/0187396 A1 | 6/2019 | Finnegan et al. |
| 2019/0235177 A1 | 8/2019 | Lu et al. |
| 2019/0250338 A1 | 8/2019 | Mullaney et al. |
| 2019/0271817 A1 | 9/2019 | Coenegracht |
| 2019/0324217 A1 | 10/2019 | Lu et al. |
| 2019/0339460 A1 | 11/2019 | Dannoux et al. |
| 2019/0339461 A1 | 11/2019 | Dannoux et al. |
| 2019/0369336 A1 | 12/2019 | Van et al. |
| 2019/0369345 A1 | 12/2019 | Reagan et al. |
| 2019/0374637 A1 | 12/2019 | Siadak et al. |
| 2020/0012051 A1 | 1/2020 | Coenegracht et al. |
| 2020/0036101 A1 | 1/2020 | Scheucher |
| 2020/0049922 A1 | 2/2020 | Rosson |
| 2020/0057205 A1 | 2/2020 | Dannoux et al. |
| 2020/0057222 A1 | 2/2020 | Dannoux et al. |
| 2020/0057223 A1 | 2/2020 | Dannoux et al. |
| 2020/0057224 A1 | 2/2020 | Dannoux et al. |
| 2020/0057723 A1 | 2/2020 | Chirca et al. |
| 2020/0096705 A1 | 3/2020 | Rosson |
| 2020/0096709 A1 | 3/2020 | Rosson |
| 2020/0096710 A1 | 3/2020 | Rosson |
| 2020/0103599 A1 | 4/2020 | Rosson |
| 2020/0103608 A1 | 4/2020 | Johnson et al. |
| 2020/0110229 A1 | 4/2020 | Dannoux et al. |
| 2020/0110234 A1 | 4/2020 | Holmberg et al. |
| 2020/0116949 A1 | 4/2020 | Rosson |
| 2020/0116952 A1 | 4/2020 | Rosson |
| 2020/0116953 A1 | 4/2020 | Rosson |
| 2020/0116954 A1 | 4/2020 | Rosson |
| 2020/0116958 A1 | 4/2020 | Dannoux et al. |
| 2020/0116962 A1 | 4/2020 | Dannoux et al. |
| 2020/0124812 A1 | 4/2020 | Dannoux et al. |
| 2020/0132939 A1 | 4/2020 | Coenegracht et al. |
| 2020/0192042 A1 | 6/2020 | Coan et al. |
| 2020/0209492 A1 | 7/2020 | Rosson |
| 2020/0218017 A1 | 7/2020 | Coenegracht |
| 2020/0225422 A1 | 7/2020 | Van et al. |
| 2020/0225424 A1 | 7/2020 | Coenegracht |
| 2020/0241211 A1 | 7/2020 | Shonkwiler et al. |
| 2020/0348476 A1 | 11/2020 | Hill et al. |
| 2020/0371306 A1 | 11/2020 | Mosier et al. |
| 2020/0393629 A1 | 12/2020 | Hill et al. |
| 2021/0318499 A1 | 10/2021 | Cote et al. |

FOREIGN PATENT DOCUMENTS

| | | |
|---|---|---|
| CN | 1071012 A | 4/1993 |
| CN | 1213783 A | 4/1999 |
| CN | 1114839 C | 7/2003 |
| CN | 1646962 A | 7/2005 |
| CN | 1833188 A | 9/2006 |
| CN | 1922523 A | 2/2007 |
| CN | 1985205 A | 6/2007 |
| CN | 101084461 A | 12/2007 |
| CN | 101111790 A | 1/2008 |
| CN | 101195453 A | 6/2008 |
| CN | 201404194 Y | 2/2010 |
| CN | 101846773 A | 9/2010 |
| CN | 101939680 A | 1/2011 |
| CN | 201704194 U | 1/2011 |
| CN | 102346281 A | 2/2012 |
| CN | 202282523 U | 6/2012 |
| CN | 203224645 U | 10/2013 |
| CN | 203396982 U | 1/2014 |
| CN | 103713362 A | 4/2014 |
| CN | 104064903 A | 9/2014 |
| CN | 104280830 A | 1/2015 |
| CN | 104603656 A | 5/2015 |
| CN | 105467529 A | 4/2016 |
| CN | 105492946 A | 4/2016 |
| CN | 106716205 A | 5/2017 |
| CN | 106873086 A | 6/2017 |
| EP | 0026553 A1 | 4/1981 |
| EP | 0244791 A2 | 11/1987 |
| EP | 0547788 A1 | 6/1993 |
| EP | 0782025 A1 | 7/1997 |
| EP | 0856751 A1 | 8/1998 |
| EP | 0957381 A1 | 11/1999 |
| EP | 1243957 A2 | 9/2002 |
| EP | 1391762 A1 | 2/2004 |
| EP | 1431786 A2 | 6/2004 |
| EP | 1438622 A2 | 7/2004 |
| EP | 1678537 A1 | 7/2006 |
| EP | 1759231 A1 | 3/2007 |
| EP | 1810062 A1 | 7/2007 |
| EP | 2069845 A2 | 6/2009 |
| EP | 2149063 A1 | 2/2010 |
| EP | 2150847 A1 | 2/2010 |
| EP | 2193395 A1 | 6/2010 |
| EP | 2255233 A1 | 12/2010 |
| EP | 2333597 A2 | 6/2011 |
| EP | 2362253 A1 | 8/2011 |
| EP | 2401641 A1 | 1/2012 |
| EP | 2609458 A1 | 7/2013 |
| EP | 2622395 A1 | 8/2013 |
| EP | 2734879 A1 | 5/2014 |
| EP | 2815259 A1 | 12/2014 |
| EP | 2817667 A1 | 12/2014 |
| EP | 2992372 A1 | 3/2016 |
| EP | 3022596 A1 | 5/2016 |

(56) References Cited

FOREIGN PATENT DOCUMENTS

| | | |
|---|---|---|
| EP | 3064973 A2 | 9/2016 |
| EP | 3101740 A1 | 12/2016 |
| EP | 3245545 A1 | 11/2017 |
| EP | 3265859 A1 | 1/2018 |
| EP | 3336992 A1 | 6/2018 |
| EP | 3362830 A1 | 8/2018 |
| EP | 3427096 A1 | 1/2019 |
| EP | 3443395 A1 | 2/2019 |
| EP | 3535614 A1 | 9/2019 |
| EP | 3537197 A1 | 9/2019 |
| EP | 3646074 A1 | 5/2020 |
| EP | 3646079 A1 | 5/2020 |
| FR | 2485754 A1 | 12/1981 |
| JP | 61-145509 A | 7/1986 |
| JP | 63-078908 A | 4/1988 |
| JP | 63-089421 A | 4/1988 |
| JP | 03-063615 A | 3/1991 |
| JP | 03-207223 A | 9/1991 |
| JP | 05-297246 A | 11/1993 |
| JP | 06-320111 A | 11/1994 |
| JP | 07-318758 A | 12/1995 |
| JP | 08-292331 A | 11/1996 |
| JP | 09-135526 A | 5/1997 |
| JP | 09-325249 A | 12/1997 |
| JP | 10-339826 A | 12/1998 |
| JP | 11-064682 A | 3/1999 |
| JP | 11-281861 A | 10/1999 |
| JP | 11-326693 A | 11/1999 |
| JP | 2001-290051 A | 10/2001 |
| JP | 2003-121699 A | 4/2003 |
| JP | 2003-177279 A | 6/2003 |
| JP | 2005-031544 A | 2/2005 |
| JP | 2005-077591 A | 3/2005 |
| JP | 2005-520987 A | 7/2005 |
| JP | 2006-023502 A | 1/2006 |
| JP | 2006-259631 A | 9/2006 |
| JP | 2006-337637 A | 12/2006 |
| JP | 2007-078740 A | 3/2007 |
| JP | 2007-121859 A | 5/2007 |
| JP | 2009-265208 A | 11/2009 |
| JP | 2010-152084 A | 7/2010 |
| JP | 2011-033698 A | 2/2011 |
| JP | 2013-156580 A | 8/2013 |
| JP | 2014-085474 A | 5/2014 |
| JP | 2014-134746 A | 7/2014 |
| JP | 5537852 B2 | 7/2014 |
| JP | 5538328 B2 | 7/2014 |
| JP | 3207233 U | 11/2016 |
| KR | 10-2013-0081087 A | 7/2013 |
| TW | 222688 B | 4/1994 |
| WO | 01/92927 A2 | 12/2001 |
| WO | 03/36358 A2 | 5/2003 |
| WO | 2004/061509 A1 | 7/2004 |
| WO | 2005/045494 A1 | 5/2005 |
| WO | 2006/009597 A1 | 1/2006 |
| WO | 2006/052420 A1 | 5/2006 |
| WO | 2006/113726 A1 | 10/2006 |
| WO | 2008/027201 A2 | 3/2008 |
| WO | 2008/150408 A1 | 12/2008 |
| WO | 2008/150423 A1 | 12/2008 |
| WO | 2009/042066 A1 | 4/2009 |
| WO | 2009/113819 A1 | 9/2009 |
| WO | 2009/117060 A1 | 9/2009 |
| WO | 2009/154990 A2 | 12/2009 |
| WO | 2010/092009 A1 | 8/2010 |
| WO | 2010/099141 A1 | 9/2010 |
| WO | 2011/044090 A2 | 4/2011 |
| WO | 2011/047111 A1 | 4/2011 |
| WO | 2012/027313 A1 | 3/2012 |
| WO | 2012/037727 A1 | 3/2012 |
| WO | 2012/044741 A1 | 4/2012 |
| WO | 2012/163052 A1 | 12/2012 |
| WO | 2013/016042 A1 | 1/2013 |
| WO | 2013/083729 A2 | 6/2013 |
| WO | 2013/122752 A1 | 8/2013 |
| WO | 2013/126488 A1 | 8/2013 |
| WO | 2014/151259 A1 | 9/2014 |
| WO | 2014/167447 A1 | 10/2014 |
| WO | 2014/179411 A1 | 11/2014 |
| WO | 2014/197894 A1 | 12/2014 |
| WO | 2015/047508 A1 | 4/2015 |
| WO | 2015/144883 A1 | 10/2015 |
| WO | 2015/197588 A1 | 12/2015 |
| WO | 2016/059320 A1 | 4/2016 |
| WO | 2016/073862 A2 | 5/2016 |
| WO | 2016/095213 A1 | 6/2016 |
| WO | 2016/100078 A1 | 6/2016 |
| WO | 2016/115288 A1 | 7/2016 |
| WO | 2016/156610 A1 | 10/2016 |
| WO | 2016/168389 A1 | 10/2016 |
| WO | 2017/063107 A1 | 4/2017 |
| WO | 2017/146722 A1 | 8/2017 |
| WO | 2017/155754 A1 | 9/2017 |
| WO | 2017/178920 A1 | 10/2017 |
| WO | 2018/083561 A1 | 5/2018 |
| WO | 2018/175123 A1 | 9/2018 |
| WO | 2018/204864 A1 | 11/2018 |
| WO | 2019/005190 A2 | 1/2019 |
| WO | 2019/005191 A1 | 1/2019 |
| WO | 2019/005192 A1 | 1/2019 |
| WO | 2019/005193 A1 | 1/2019 |
| WO | 2019/005194 A1 | 1/2019 |
| WO | 2019/005195 A1 | 1/2019 |
| WO | 2019/005196 A1 | 1/2019 |
| WO | 2019/005197 A1 | 1/2019 |
| WO | 2019/005198 A1 | 1/2019 |
| WO | 2019/005199 A1 | 1/2019 |
| WO | 2019/005200 A1 | 1/2019 |
| WO | 2019/005201 A1 | 1/2019 |
| WO | 2019/005202 A1 | 1/2019 |
| WO | 2019/005203 A1 | 1/2019 |
| WO | 2019/005204 A1 | 1/2019 |
| WO | 2019/036339 A1 | 2/2019 |
| WO | 2019/126333 A1 | 6/2019 |
| WO | 2019/195652 A1 | 10/2019 |
| WO | 2020/101850 A1 | 5/2020 |

OTHER PUBLICATIONS

Faulkner et al. "Optical networks for local lopp applications," J. Lightwave Technol.0733-8724 7(11), 17411751 (1989).

Ramanitra et al. "Optical access network using a self-latching variable splitter remotely powered through an optical fiber link," Optical Engineering 46(4) p. 45007-1-9, Apr. 2007.

Ratnam et al. "Burst switching using variable optical splitter based switches with wavelength conversion," ICIIS 2017—Poeceedings Jan. 2018, pp. 1-6.

Wang et al. "Opto-VLSI-based dynamic optical splitter," Electron. Lett.0013-5194 10.1049/el:20046715 40(22), 14451446 (2004).

Xiao et al. "1×N wavelength selective adaptive optical power splitter for wavelength-division-multiplexed passive optical networks," Optics & Laser Technology 68, pp. 160-164, May 2015.

European Patent Application No. 20198906.8 European Search Report and Search Opinion dated Feb. 24, 2021; 8 Pages; European Patent Office.

Liu et al., "Variable optical power splitters create new apps", Retrieved from: https://www.lightwaveonline.com/fttx/pon-systems/article/16648432/variable-optical-power-splitters-create-new-apps, 2005, 14 pages.

* cited by examiner

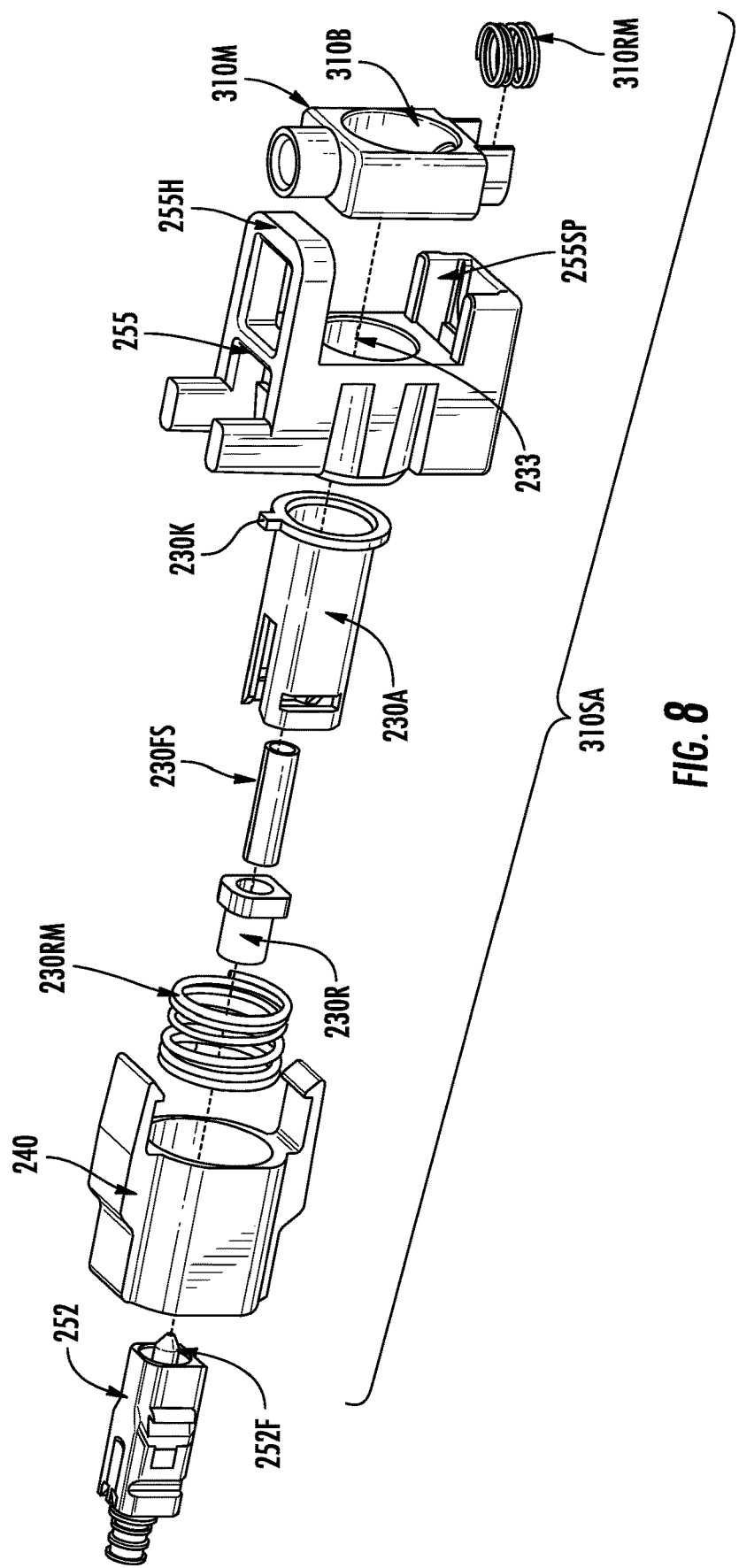

FIBER OPTIC TERMINALS AND FIBER OPTIC NETWORKS HAVING VARIABLE RATIO COUPLERS

RELATED APPLICATIONS

This application claims the benefit of priority under 35 U.S.C. § 119 of U.S. Provisional Application Ser. No. 62/911,731 filed Oct. 7, 2019. the content of which is relied upon and incorporated herein by reference in its entirety.

FIELD

The disclosure is directed to fiber optic terminals having variable ratio couplers for changing the output power level of optical outputs along with fiber optic networks using the terminals.

BACKGROUND

Optical fiber is increasingly being used for a variety of applications, including but not limited to broadband voice, video, and data transmission. As bandwidth demands increase optical fiber is migrating deeper into communication networks such as in fiber to the premises applications such as FTTx, 5G and the like. As optical fiber extends deeper into communication networks there exist a need for building more complex and flexible fiber optic networks in a quick and easy manner.

Terminals such as multiports or closures were also developed for making one or more optical connections with hardened connectors such as the OptiTap® plug connector. Prior art multiports have an input cable or input port with a plurality of receptacles mounted through a wall of the housing for protecting an indoor connector inside the housing that makes an optical connection to the external hardened connector of the branch or drop cable.

Illustratively, FIG. 1 shows a conventional fiber optic multiport 1 having an input fiber optic cable 4 carrying one or more optical fibers to indoor-type connectors inside a housing 3. The multiport 1 receives the optical fibers into housing 3 and distributes the optical fibers to receptacles 7 for connection with a hardened connector. The receptacles 7 are separate assemblies attached through a wall of housing 3 of the multiport 1. The receptacles 7 allow mating with hardened connectors attached to drop or branching cables (not shown) such as drop cables for "fiber-to-the-home" applications. During use, optical signals pass through the branch cables, to and from the fiber optic cable 4 by way of the optical connections at the receptacles 7 of multiport 1. Fiber optic cable 4 may also be terminated with a fiber optic connector 5.

Multiports 1 allow quick and easy deployment by service providers for passive optical networks. Further, multiport 1 may use a coupler or splitter inside the multiport to allow a single input optical signal to be split into multiple output channels. By way of explanation, the input fiber optic cable may have a single optical fiber that is in optical communication with a 1:N splitter for outputting N output signals. However, the power level of the input optical channel is divided among the N output signals in a passive optical network (e.g., no active components are used in the passive portion of the optical network). By way of explanation, a 1:2 coupler may split the power from the single input optical fiber as 50% power for the first output optical signal and 50% power for the second output optical signal. Other couplers may have unequal splits in the power level as desired such as splitting the power from the single input optical fiber as 80% power for the first output optical signal and 20% power for the second output optical signal depending on the requirements for the fiber optic network. Furthermore, multiports may be daisy-chained together for building more complicated fiber optic networks with further power level splits for the distribution of passive optical signals. By way of a simple explanation, an input optical signal from the central office may be able to accommodate a total split of 1:16 for the given input power level of the optical signal. An upstream multiport may have a 1:2 split with equal power levels for the two output fibers that each feed separate downstream multiports having a further 1:8 split with equal power levels, thus the single input fiber is split into 16 output signal each having an equal power level.

However, conventional couplers or splitters have a fixed power level split for the output signals. This fixed power level split does readily allow for easy modification to the fiber optic network due to changed circumstances such as adding new customers or adapting the power levels needed for different loss budgets across the length of the passive optical network.

Consequently, there exists an unresolved need for terminals that provide quick and easily deployment for the fiber optic network in a flexible manner while also addressing concerns related to limited space, organization, or aesthetics.

SUMMARY

The disclosure is directed to fiber optic terminals (hereinafter "terminals") and fiber optic networks comprising variable ratio couplers. The terminals with variable ratio couplers allow the power levels for the optical outputs from the variable ratio coupler to be changed as desired, thereby providing flexibility for the network operators to adapt or customize their network for their given needs.

One aspect of the present disclosure is directed to a fiber optic terminal comprising a shell having a cavity, at least one variable ratio coupler having a portion disposed within the cavity, at least one input connection port, and a pass-through connection port. The variable ratio coupler comprises an optical input, a first optical output, a second optical output and a control. The control allows changing of an output power level between the first optical output and the second optical output at a coupling region.

Another aspect of the disclosure is directed to a fiber optic terminal comprising a shell having a cavity, at least one variable ratio coupler having a portion disposed within the cavity, and a plurality of output connection ports. The variable ratio coupler comprises an optical input, a first optical output, a second optical output and a control. The control allows changing of an output power level between the first optical output and the second optical output at a coupling region. A portion of a first optical waveguide of the first optical output and a portion of a second optical waveguide of the second optical output are fused together to form the coupling region. The control is configured for moving a portion of the coupling region for changing the output power level between the first optical output and the second optical output.

Still another aspect of the disclosure is directed to a fiber optic network comprising a terminal, a first optical link and a second optical link. The terminal comprises a shell having a cavity, at least one variable ratio coupler having a portion disposed within the cavity. The variable ratio coupler comprises an optical input, a first optical output, a second optical output and a control. The control allows changing of an output power level between the first optical output and the second optical output at a coupling region. A portion of the first optical waveguide of the first optical output (OT1) and a portion of the second optical waveguide of the second optical output (OT2) form a coupling region, and the control allows changing of the output power level between the first optical output and the second optical output.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIG. 8 is an exploded view of the modular adapter sub-assembly of FIG. 7 along with the internal connector of the terminal;

DETAILED DESCRIPTION

Figure 1:
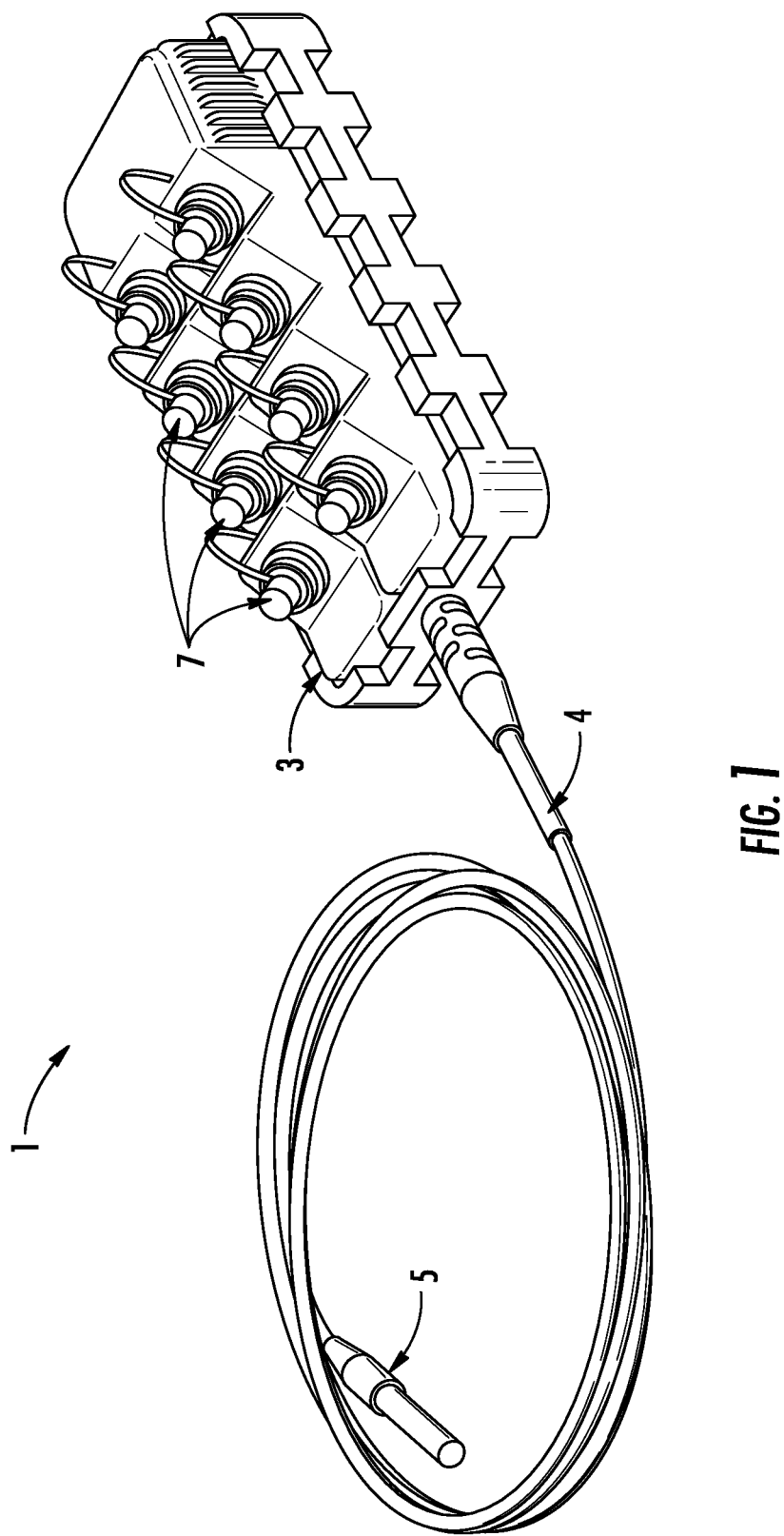
FIG. 1 is a prior art multiport.

Reference will now be made in detail to the embodiments of the disclosure, examples of which are illustrated in the accompanying drawings. Whenever possible, like reference numbers will be used to refer to like components or parts.

The concepts disclosed are related to fiber optic network and fiber optic terminals having at least one variable ratio coupler with a control for changing an output power level between a first optical output and a second optical output for a passive optical network. As used herein, "variable ratio coupler" means that the output power level may be adjusted to many different power level splits across the spectrum of output power levels so that the power level split may be tuned or changed by the user as desired in a passive operation that doesn't require consuming energy for its operation, and does not mean the power level may only be changed to two discrete power level splits. Consequently, the fiber optic terminals (hereinafter "terminals") comprising the variable ratio coupler(s) (hereinafter "VRC(s)") are well-suited for passive optical networks such as in the outside plant environment such as downstream from a central office location or the like, but other applications are possible.

In addition to the passive operation and providing a wide range of possible output power split levels, the concepts using the VRC disclosed provide a stable performance across varying conditions. Further, the terminals and networks using the VRC have a low polarization dependent loss (PDL). In other words, the polarization state of the optical signal does not adversely impact the performance of the terminals or networks. Thus, the polarization state of the optical signal is not a factor for performance or operation. By way of example, the PDL loss is about 0.5 dB or less, and may even be as low as 0.3 dB or less or 0.2 dB or less for any polarization state of the input optical signal.

Still further, terminals and networks using the VRC have a wide wavelength range for suitable performance. By way of example, the terminals and networks using VRC comprise a similar performance from about 1260 nm to about 1625 nm. Generally speaking, the terminals disclosed and explained in the exemplary embodiments are multiports, but the concepts disclosed may be used with any suitable terminal such as closures, network interface devices, wireless radios or the like having at least one variable ratio coupler with a control for changing an output power level.

The concepts disclosed advantageously provide flexibility for the network operators and also reduce manufacturing complexity and inventory concerns for manufacturers of the terminals along with network operators since the need to manufacture and stock a multitude of terminals having different fixed power split levels is not necessary. In other words, the terminals and fiber optic networks disclosed may be adjusted to have the desired power level splits at any point during its lifetime, thereby providing flexibility and adaptability to alter the fiber optic network based on moves, adds or changes to the fiber optic network. The concepts may be used with any suitable terminals and may be especially advantageous with terminals having compact form-factors. The concepts are scalable to any suitable count of input or outputs on a terminal in a variety of arrangements or constructions for building fiber optic networks.

For instance, the concepts disclosed herein are suitable for fiber optic networks such as for Fiber-to-the-Home and 5G applications and are equally applicable to other optical applications as well including indoor, industrial, wireless, or other suitable applications. The concepts disclosed herein are especially advantageous for asymmetric split fiber optic networks (e.g., fiber optic networks having one VRC with an unequal output power level split). Additionally, the concepts disclosed may be used with terminals having any suitable footprint or construction. Various designs, constructions, or features for fiber optic networks and terminals are disclosed in more detail as discussed herein and may be modified or varied as desired.

Figure 2:
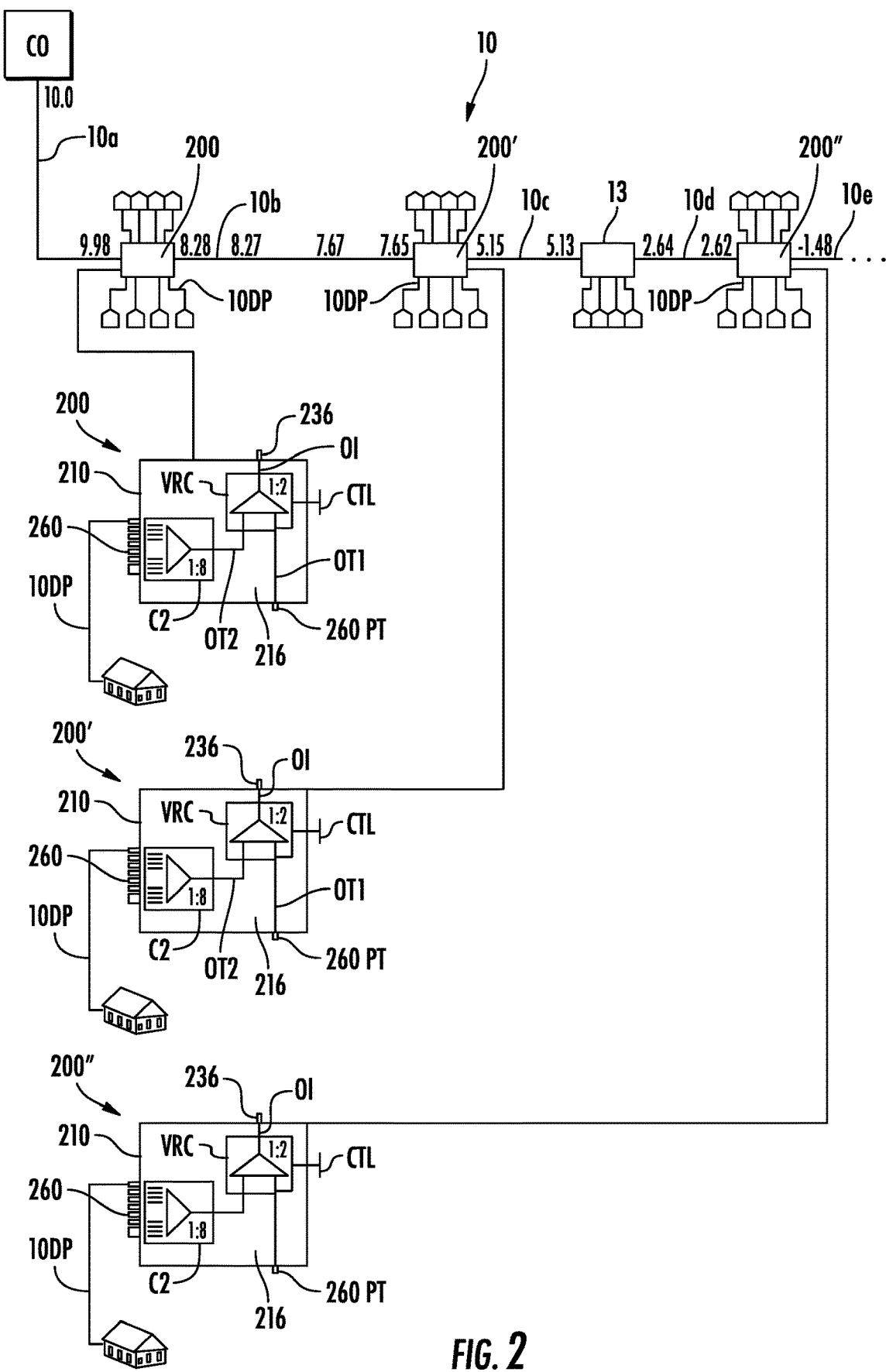
FIG. 2 is a schematic representation of a fiber optic network having terminals with a variable ratio coupler.

FIG. 2 shows a schematic view of an explanatory fiber optic network 10 such as for a passive fiber-to-the-home (FTTH) or network comprising a first terminal 200 having a VRC; however, the concepts maybe used with other networks such as a PON, FTTx or 5G networks. As depicted, a first optical link 10a (e.g., a first fiber optic cable) is an input optical link connected to a central office CO at a first end and a second end is in optical communication with the optical input OI of the first terminal 200. A first end of a second optical link 10b (e.g., a second optical cable) is an output optical link of terminal 200 and is in optical communication with the first optical output (OT1) of the terminal 200 as depicted. A second end of the second optical link 10b is in optical communication with the optical input OI of a second terminal 200'. A first end of a third optical link 10c (e.g., a third optical cable) is an output optical link of terminal 200' and is in optical communication with the first optical output (OT1) of the terminal 200' as depicted. A second end of the third optical link 10c feeds into a conventional terminal 13 as an input link. A first end of a fourth optical link 10d (e.g., a fourth optical cable) is an output link of conventional terminal 13. A second end of the fourth optical link 10d is in optical communication with the optical input OI of a third terminal 200". A first end of a fifth optical link 10e (e.g., a fifth optical cable) is an output optical link of terminal 200" and is in optical communication with the first optical output (OT1) of the terminal 200" as depicted. The fiber optic network 10 splits the power level launched from the CO at the respective terminals 200, 200' and 200" for the distribution of optical signals to the fiber optic network 10.

Terminals 200, 200' and 200" are schematically depicted in FIG. 2 each of which comprise a shell 210 having a cavity 216 with a portion of the respective VRCs being disposed with the respective cavities 216. The terminals 200, 200' and 200"also comprise at least one input connection port 236, and a plurality of output connection ports 260. The VRCs each also comprise the optical input (OI), the first optical output (OT1), the second optical output (OT2) and a control (CTL) for changing an output power level between the first optical output (OT1) and the second optical output (OT2) as depicted. The input connection port 236 may comprise a port opening 238 extending from an outer surface (234) of the terminal 200 into the cavity 216 and defines a port passageway 233 along a longitudinal axis. In this embodiment, terminals 200, 200' and 200" of fiber optic network 10 comprise the same configuration as depicted; however, the VRCs are adjusted with different output power level split between the respective first optical output (OT1) and second optical output (OT2) using the control (CTL). The output power level split for the VRC may be asymmetric or not depending on the desired output power levels.

By way of explanation, fiber optic network 10 distributes the signal from the second optical output (OT2) from the respective VRCs to each local neighborhood where the bandwidth of the optical output is shared by multiple subscribers. For instance, terminal 200 may have its VRC adjusted to a 90/10 split of the power received from the central office (CO) (minus losses) with 90% of the input power being directed to the first optical output (OT1) and 10% of the input power being directed to the second optical output (OT2) for the distribution of optical signals to its local neighborhood. Thereafter, terminal 200' that receives 90% of the power transmitted to its optical input (OI) (minus losses such as connector losses, transmission losses, etc.), and may have its VRC adjusted to a 75/25 split of the power received at its optical input (OI) with 75% of the input power to terminal 200' being directed to its first optical output (OT1) and 25% of the input power being directed to its second optical output (OT2) for the distribution of optical signals to its local neighborhood. Terminal 200" that receives 75% of the power from the optical output (OT1) of terminal 200' at the optical input (OI) may have its VRC adjusted to a 50/50 split of the power received with 50% of the input power being directed to the first optical input (OT1) and 50% of the input power being directed to the second optical output (OT2) for the distribution of optical signals to its local neighborhood. This representative fiber optic network 10 allows the desired power levels to be transmitted to the local neighborhoods, while transmitting the remaining power downstream in the fiber optic network 10 as desired. Moreover, the output power level split ratios within the terminals 200, 200' and 200" may be easily and quickly adjusted by the network operator as needed for moves, adds or changes in the fiber optic network 10 as desired, thereby providing flexibility and adaptability that is lacking in conventional fiber optic networks.

Figure 3:
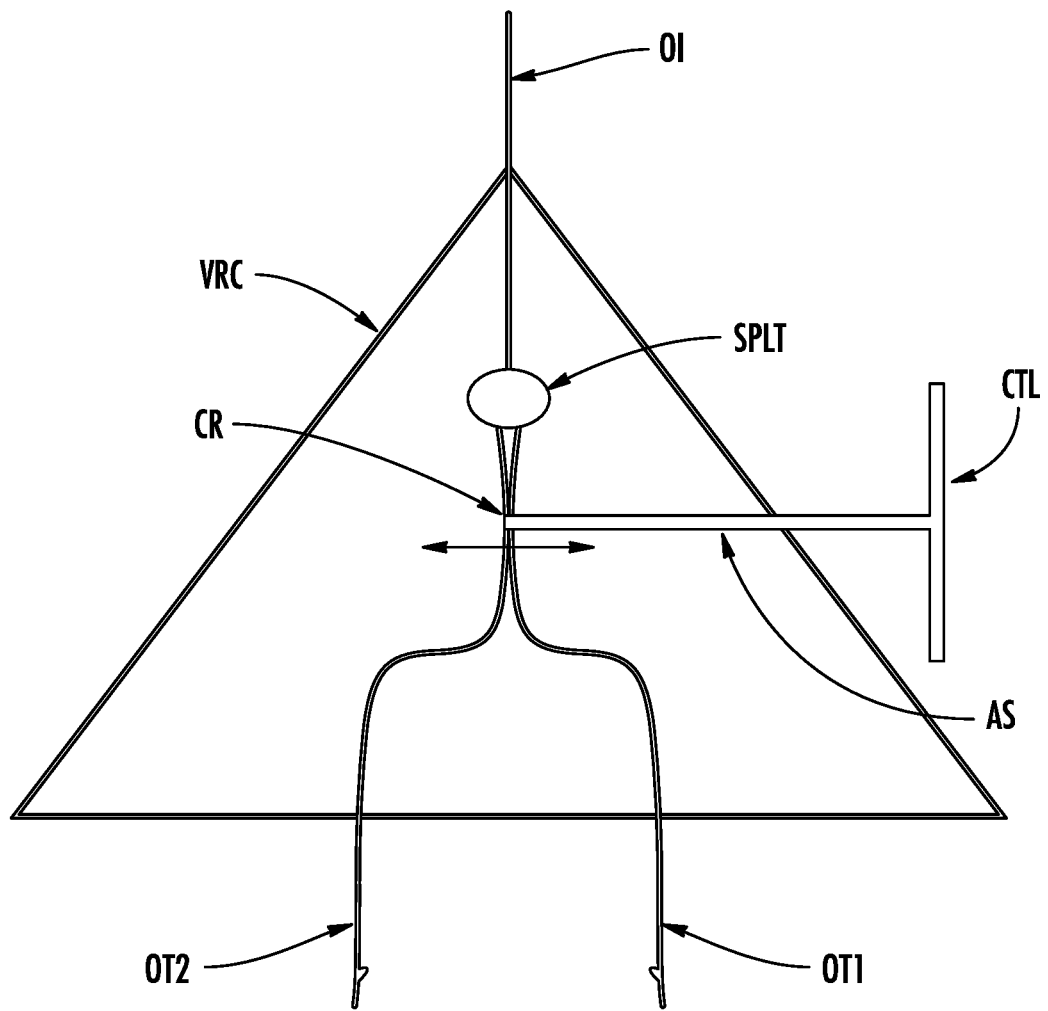
FIG. 3 is a schematic representation of the variable ratio coupler depicted in the terminals of FIG. 2.

FIG. 3 is a schematic representation of the VRC depicted in terminals 200, 200' and 200". As depicted, VRC comprises an optical input (OI) that has its output power level split between the first optical output (OT1) and the second optical output (OT2) as schematically represented by a splitter (SPLT) shown as the filled circle along with the control (CTL) for changing the output power level between the first and second outputs (OT1, OT2). The coupler may be a planar lightwave circuit (PLC) or multiclad coupler (MC) as known in the art, but other suitable structures may be used. The optical input (OI) and the optical outputs (OT1, OT2) are optical waveguides such as optical fibers that may be in optical communication with the respective input and outputs of the planar lightwave circuit or other type of device. Control (CTL) may be actuated for changing the output power level between the first optical output (OT1) and the second optical output (OT2) by any suitable means at the coupling region (CR). Although the splitter (SPLT) and coupling region (CR) are depicted as separate elements in the schematic representation of the VRC for the purposes of explanation they typically are one structure in the VRC.

The coupling region (CR) is the region where a portion of the first optical waveguide of the first optical output (OT1) and a portion of the second optical waveguide of the second optical output (OT2) that are in optical (e.g., intimate) contact for allowing the changing of the output power level of the optical signals transmitted by the first optical output (OT1) and the second optical output (OT2). More specifically, the control (CTL) is configured for moving a portion of the first optical waveguide of the first optical output (OT1) and/or moving a portion of the second optical waveguide of the second optical output (OT2) at the coupling region (CR) as represented by the horizontal line with the arrows on the ends. The moving of the first and/or second optical waveguides with the control (CTL) may bend, deflect or change the geometry of between the portion of the first optical waveguide of the first optical output (OT1) and the portion of the second optical waveguide of the second optical output (OT2) at the coupling region (CR) for changing the output power level of the optical signals transmitted by the first optical output (OT1) and the second optical output (OT2). In further embodiments, the portion of the first optical waveguide and the portion of the second optical waveguide are fused together at the coupling region (CR). Other construction are possible for the coupling region (CR) for changing the output power level of the optical signals transmitted by the first optical output (OT1) and the second optical output (OT2). For instance, other embodiments may change the index of refraction of the materials in or around the coupling region (CR).

Figure 4:
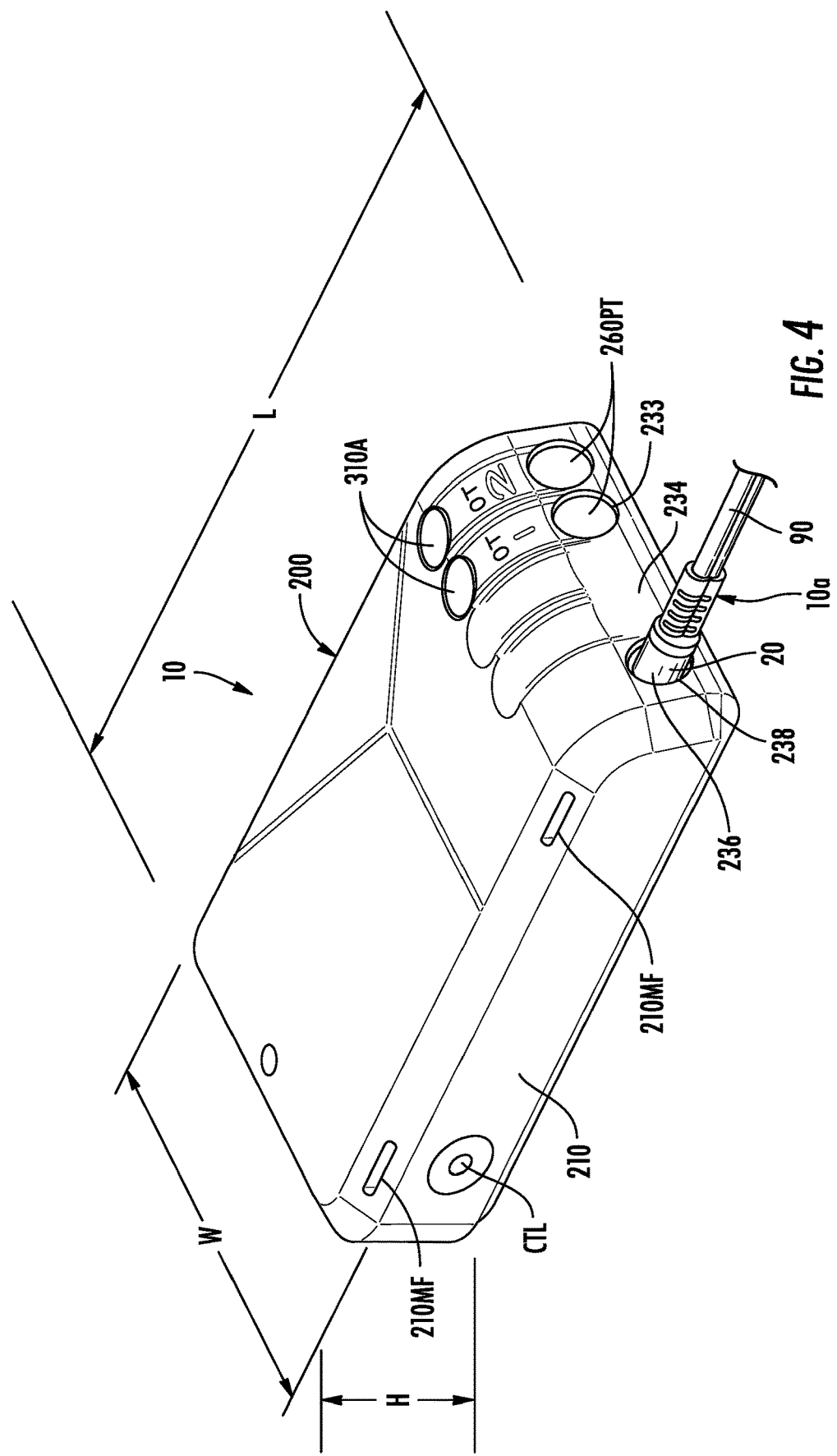
FIG. 4 is a perspective view of an explanatory fiber optic terminal comprising a variable ratio coupler disposed within a cavity of the terminal with an external control for changing an output power level between a first optical output and a second optical output.
Figure 5:
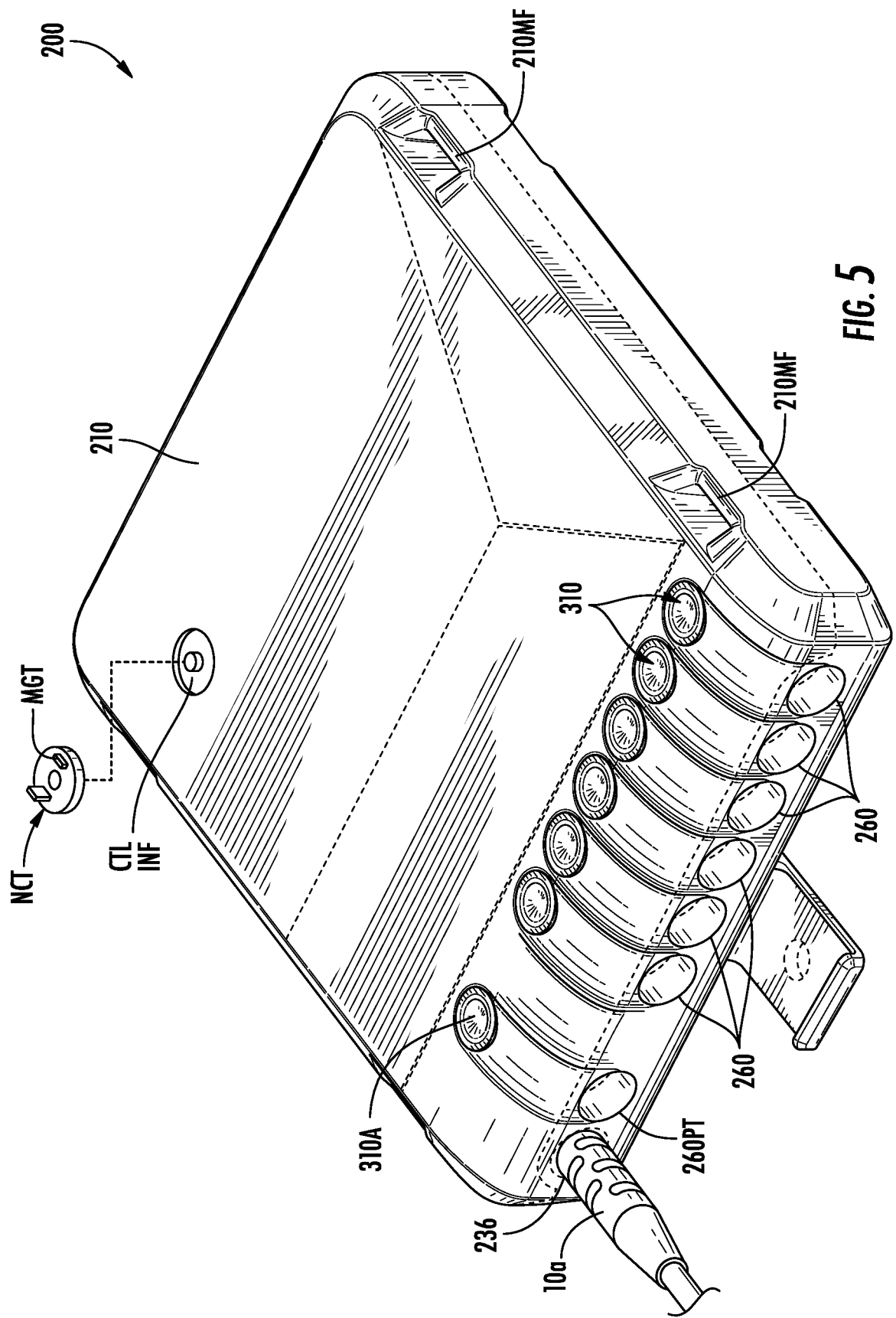
FIG. 5 is a perspective view of another explanatory fiber optic terminal similar to the fiber optic terminal of FIG. 4, but comprising a variable ratio coupler with an internal control and different number of output connection ports.
Figure 6:
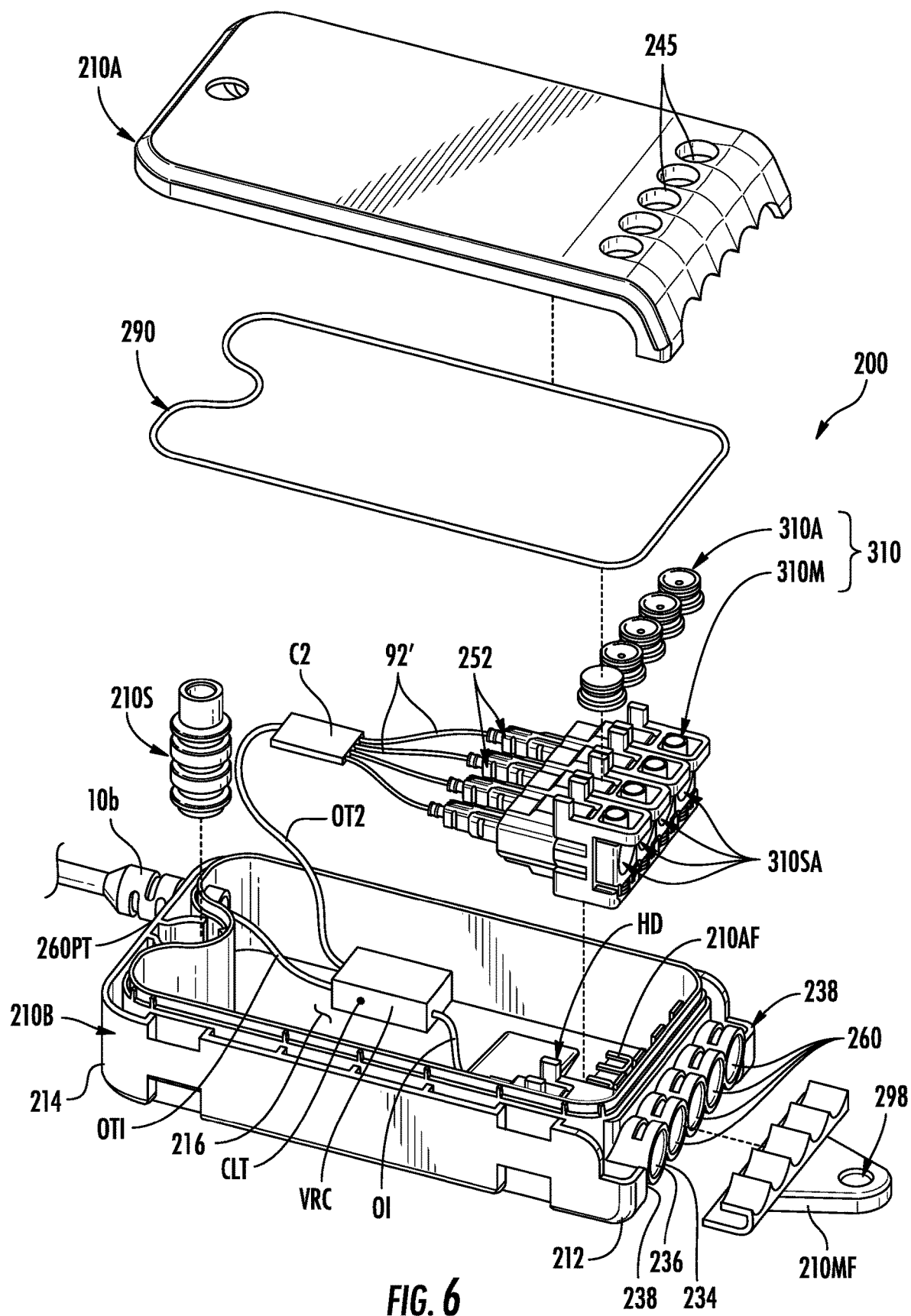
FIG. 6 is a partially exploded view of another explanatory terminal showing further details of a specific construction for terminals.

Any suitable structure may be used for actuating the control (CTL) and changing the output power level split between the first optical output (OT1) and the second optical output (OT2) such as represented by the terminals 200 of FIGS. 4-6. By way of explanation, the control (CTL) may comprise a fine-threaded adjustment screw (AS) for controlling the bending displacement of the respective portions of first and second optical outputs (OT1, OT2), thereby changing the output power level split as depicted in FIG. 4. The adjustment screw (AS) may have a suitable interface attached at one end for moving the first and/or second optical waveguides of the optical outputs at the coupling region (CR). The adjustment screw (AS) may be actuated (e.g., turned) using any suitable structure desired for the application. For instance, the adjustment screw may comprise an end with tip that receives or cooperates a tool for turning or have a knob attached to the adjustment screw so that no tool is needed for adjustment. Still further, the control (CTL) may have a construction so that changing of the output power level be made in a non-contact manner such as depicted in FIG. 5. The control (CTL) may also have a specific number of output power level splits such as having detents on a dial for aiding the craft in selecting the desired output power levels without having to measure the output power levels.

More specifically, terminal 200 of FIG. 5 comprises a control interface (CLT INF) disposed on shell 210 for changing the output power level between the first and second optical outputs (OT1, OT2) without entering the terminal 200. This non-contact construction allows the VRC and its control (CTL) to be disposed within the shell 210. Consequently, there are no portions related to the VRC and its control (CTL) that require dedicated sealing for environmental protection at the interface with the shell 210. For instance, the control (CLT) may have a magnetic operation for changing the output power level between the first and second optical outputs (OT1, OT2). Specifically, adjustment screw (AS) may have a knob attached that with the knob disposed within the shell 210 of the terminal 200. For instance, the knob may comprises a magnetic material portion (e.g., a ferrous material or a magnet) so that a suitable magnet (or ferroumaterial) may be rotated using a non-contact tool (NCT) for making the adjustment and changing the power level split externally to the shell 210 of the terminal 200. By way of example, the knob may be formed from a polymer with a magnetic portion such as a ferrous portion so that the knob may be rotated by a magnetic tool that magnetically couples to the knob through the wall of shell 210. As depicted, terminal 200 of FIG. 5 comprises a control interface (CTL INF) configured as a round recess in the shell 210 for aligning the non-contact tool (NCT) with the knob of the control (CTL) through the wall of shell 210. By way of explanation, the non-contact tool (NCT) is a round disc with a suitable magnet (MGT) therein as depicted. Non-contact tool (NCT) cooperates with the control interface (CTL INF) such as by seating within the recess of the control interface (CTL INF) and may be coupled to the knob of the control (CTL) magnetically so that when the non-contact tool (NCT) is properly aligned and turned the knob of control (CTL) will also turn for changing the output power level split. Consequently, the adjustment of the control (CTL) may be made through the shell 210 of the terminal 200 by placing the magnet or ferrous material adjacent to the knob at the control interface (CTL INF) and turning without having to physically contact the knob or the adjustment screw (AS). In this construction, the VRC and its control (CLT) may be completely disposed within to the shell (210) while also inhibiting unauthorized tampering with the terminal 200.

In other constructions, the VRC and its control (CLT) may be disposed within the cavity 216 of a terminal 200 such as a re-entrable closure so that only an authorized technician may enter the terminal for changing the output power level split for inhibiting tampering by unauthorized personnel. In these terminal constructions, the entirely of the VRC and its control (CTL) is sealed within the terminal 200. In still other terminal constructions, a portion of the control (CTL) may be disposed external to the shell 210 of the terminal 200 for providing external access for changing the output power level such as shown in FIG. 4.

The concepts disclosed herein may be used with any suitable terminal comprising one or more connection ports as desired for inputs, outputs or pass-throughs. Generally speaking, the terminals 200 disclosed herein comprise at least one input connection port 236 and at least one output connection port 260,260PT that are defined by an opening extending into a cavity 216 of the terminal 200. The connection ports may be configured for receiving external optical connectors or one or more connection ports for receiving fiber optic cables through a wall of the terminal and into the cavity of the terminal. The connection ports may include any suitable mating mechanism or geometry for securing the external connector to the terminal or have any suitable construction for receiving a fiber optic cable into the cavity of the terminal.

Although, these concepts are described with respect to terminals configured as multiports the concepts may be used with any other suitable terminal such as closures, network interface devices, wireless devices, distribution point unit or other suitable devices.

In some embodiments, the connection ports of the terminal may have a push-and-retain connection without the use of threaded coupling nuts or quick turn bayonets for securing the external connectors. This allows for terminals with connection ports that are closely spaced together and may result in relatively small terminals since the room needed for turning a threaded coupling nut or bayonet is not necessary. The compact form-factors may allow the placement of the terminals in tight spaces in indoor, outdoor, buried, aerial, industrial or other applications while providing at least one connection port that is advantageous for a robust and reliable optical connection in a removable and replaceable manner. The disclosed terminals may also be aesthetically pleasing and provide organization for the optical connectors in manner that the prior art terminals cannot provide. However, the external fiber optic connectors may be secured to the terminal using conventional structures such as threads, bayonets or other suitable mating geometry for attaching to the connector ports of the terminal.

Terminals may also have a dense spacing of connection ports for receiving external optical connectors if desired or not. The terminals disclosed herein advantageously allow a relatively dense and organized array of connection ports in a relatively small form-factor while still being rugged for demanding environments; however, terminals of any size or shape are possible using the concepts disclosed. As optical networks increase densifications and space is at a premium, the robust and small-form factors for devices such as terminals depicted herein becomes increasingly desirable for network operators.

Returning to the explanatory terminals 200 depicted in FIGS. 4-6 comprising a VRC having a portion disposed within a cavity 216 of shell 210 with a control (CTL). FIG. 4 depicts terminal 200 comprising at least one input connection port 236 and at least one pass-through output connection port 260PT to the right of input connection port 236. This terminal 200 comprises two pass-through output connection ports 260PT as shown for the first optical output (OT1) and the second optical output (OT2). Input connection port 236 and pass-through output connection ports 260PT are suitable for receiving respective external fiber optic connectors 100 of the optical link 10 such as shown in FIGS. 12-15 for making an optical connection with the terminal 200.

FIG. 5 depicts another explanatory terminal 200 that comprises at least one input connection port 236 and a pass-through connection port 260PT. In this construction, the terminal 200 comprises an optical link 10a configured as a fiber optic cable that is secured to the input connection port 236 as a tether cable and optically connected to the optical input (OI) of the VRC. In other words, the fiber optic cable is not intended to be removable from the input connection port 236. The other end of the tether cable may be terminated with a suitable fiber optic for optical connectivity to the fiber optic network.

Figure 7:
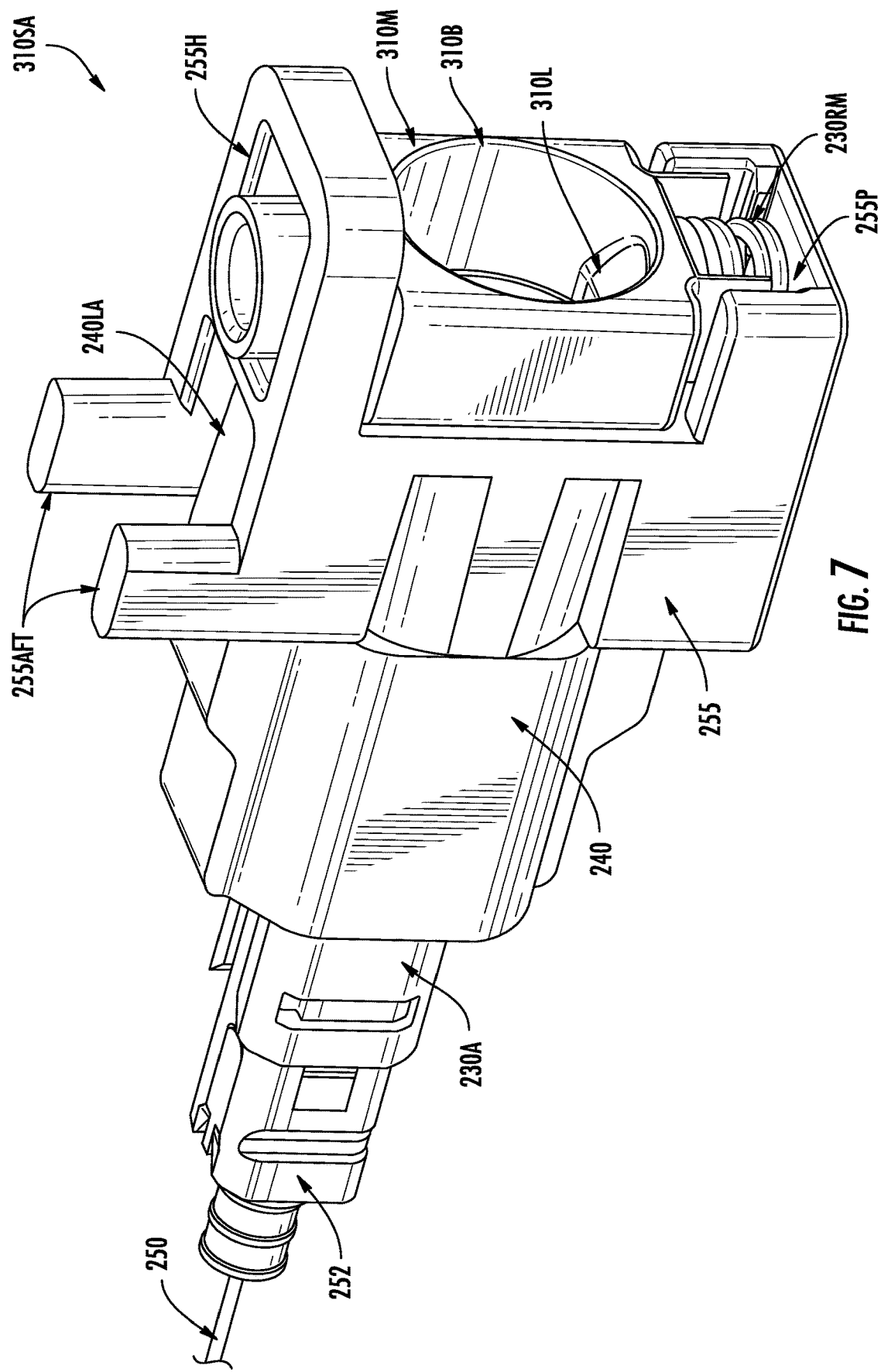
FIG. 7 is an assembled perspective view of the modular adapter sub-assembly associated with the respective connection ports of the terminal of FIG. 6 for receiving an external fiber optic connector to mate with the internal connector of the terminal.

On the other hand, the pass-through connection port 260PT of terminal 200 of FIG. 5 is in optical communication with the first optical output (OT1) of the VRC. Terminal 200 of FIG. 5 also comprises a second coupler (C2) in optical communication with the second optical output (OT2) of the VRC such as schematically depicted in FIG. 2. The second optical coupler (C2) comprises a plurality of second coupler outputs (C201-C20x), and the second coupler outputs (C201-C20x) are in optical communication with a plurality of optical connection ports 260. More specifically, the second coupler outputs may comprise optical fibers extending from the PLC that are optically connected or terminated with respective fiber optic connectors 252 disposed within the cavity 216 of the terminal and are aligned with the respective port 260 for optical connection with the terminal 200. Terminal 200 of FIG. 5 comprises six output connection ports 260, but terminals 200 may use any suitable number of output connection ports as desired. The output connection ports 260 may be optically connected to drop cables having a suitable connector for routing the optical signals toward the subscribers. FIG. 6-8 depict details of a representative construction for the terminals 200.

In further explanation the terminals 200 of FIGS. 4-6, comprises a shell 210 with a cavity 216 along with a securing feature 310 comprising a securing member 310M associated with the port passageway 233. The input connection port 236, and pass-through connection ports 260PT each comprises a port opening extending from an outer surface of the terminal 200 into the cavity 216 of the terminal 200 and each port respectively defines a port passageway along a longitudinal axis. Each port 236, 260PT has a respective securing member 310M is associated with port. Each securing member 310M comprises a bore 310B suitable for receiving and securing a portion of the housing 20 of the fiber optic connector of the respective optical link such as depicted with the input optical link 10a inserted into the input connection port 236. Likewise, the output connection ports 260 where used may have a similar construction as described for the input connection port 260 and pass-through connection ports 260PT. Terminals 200 may also advantageously use the securing members 310M for releasably connecting the external fiber optic connectors 100 of the optical links in the respective connection ports using an actuator 310A of securing feature 310.

Figure 11:
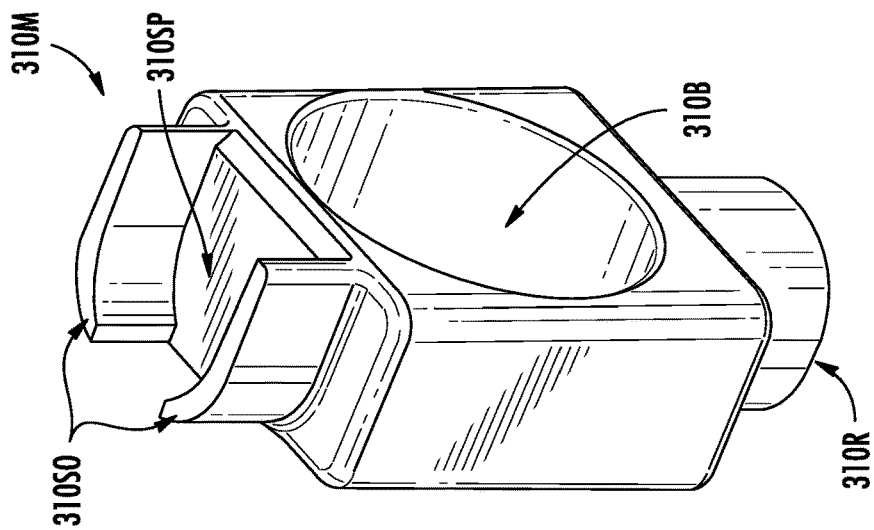
FIGS. 9-11 are various views showing the details of the securing member of FIGS. 7 and 8
Figure 10:
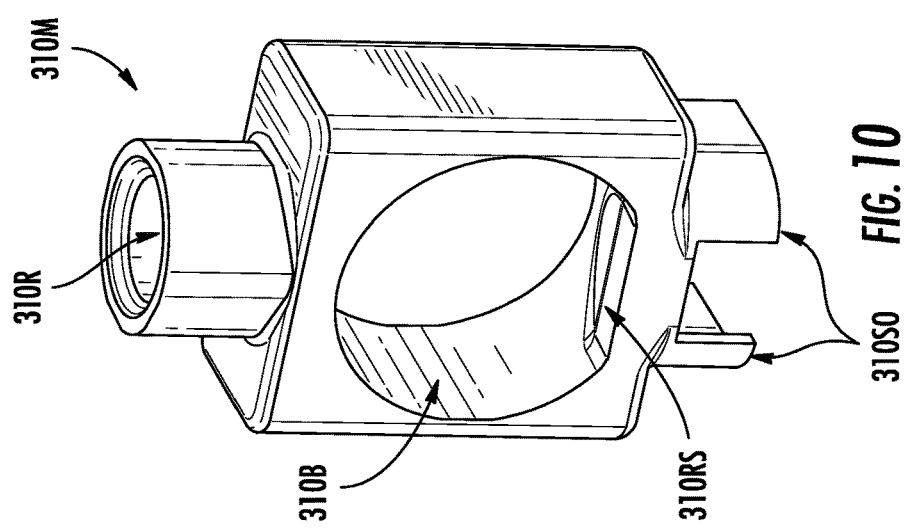
Figure 9:
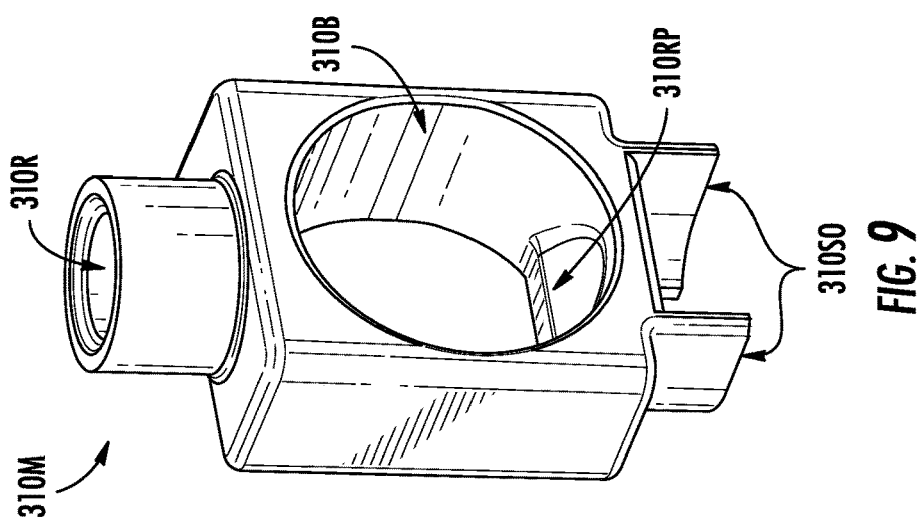
Figure 12:
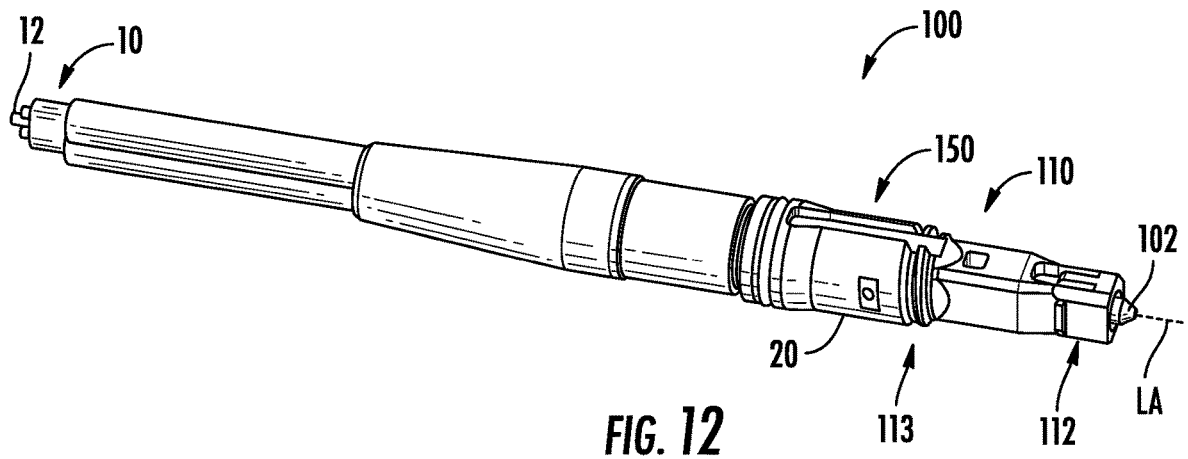
FIG. 12 is a perspective view of an optical link having a fiber optic connector suitable for making an optical connection with a connection port of a terminal.
Figure 13:
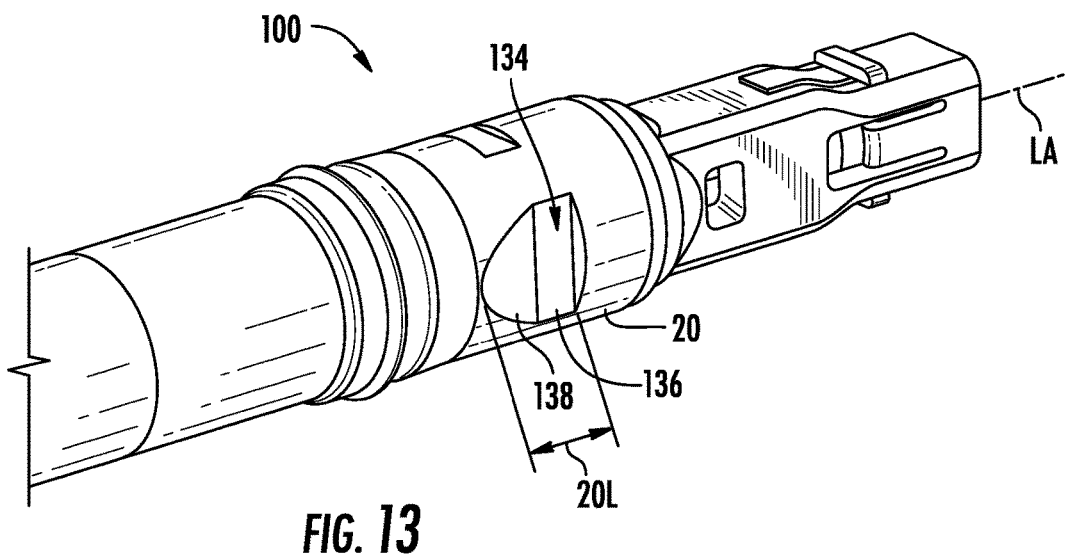
FIG. 13 is a perspective view showing the locking feature of the fiber optic connector of FIG. 12.
Figure 14:
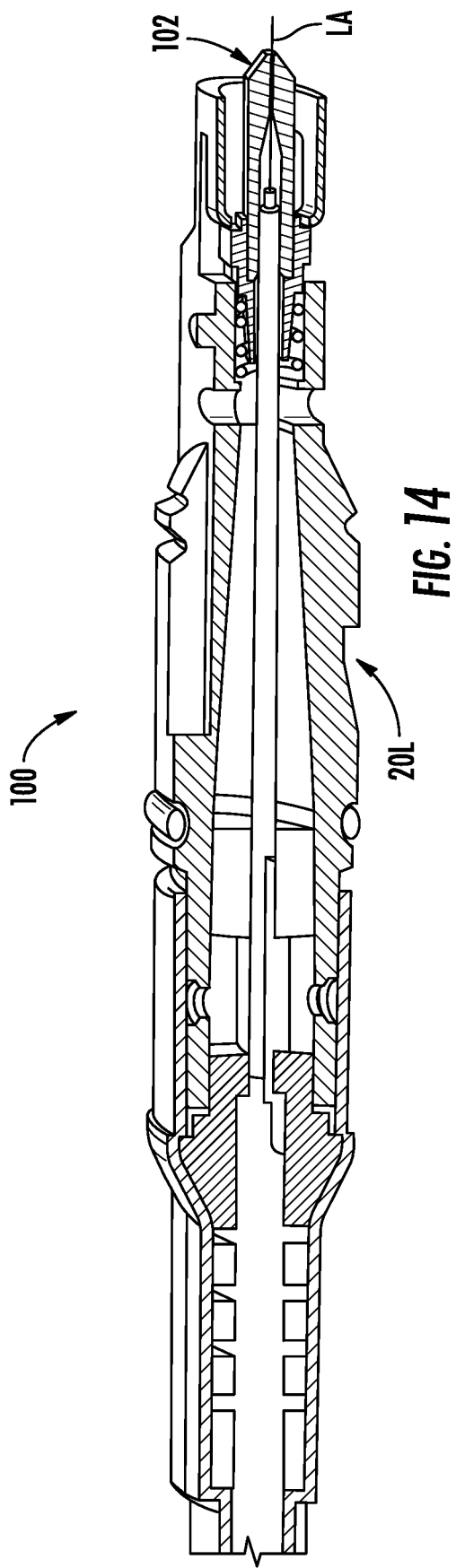
FIG. 14 is a cross-sectional view of the fiber optic cable of FIG. 12.
Figure 15:
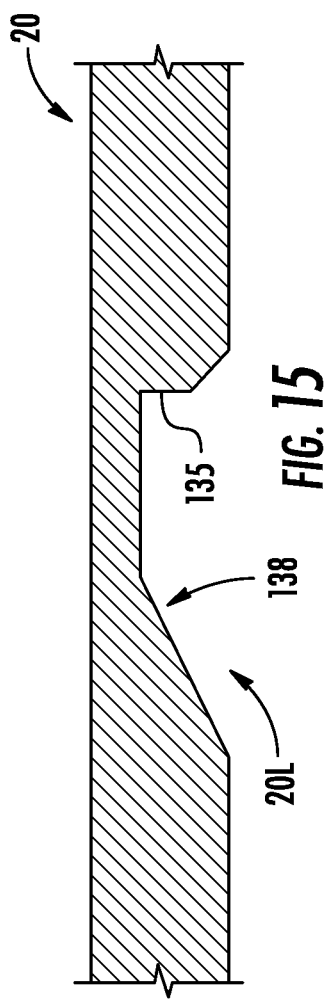
FIG. 15 is a detail cross-sectional view of the locking feature of the fiber optic connector of FIG. 12.

FIG. 6 is an exploded view showing details of terminals 200, and FIGS. 7 and 8 show an exploded view of a modular sub-assemblies 310SA associated with respective ports 236, 260 for releasably securing the external fiber optic connector. Terminal 200 of FIG. 6 comprises an input connection port 236 and output connection ports 260 configured for receiving external fiber optic connector 100, and the pass-through output connection port 260PT comprises an optical link 10b configured as a fiber optic cable that is secured to the pass-through connection port 260PT as a tether cable and is in optically communication with to the first optical output (OT1) of the VRC. FIGS. 9-11 depict securing member 310M comprising a locking feature 310L and will be discussed in further detail. The securing member 310M may be used with a securing feature 310 for releasably attaching an external fiber optic connector 100 of an optical link 10 or a drop cable attached to output connection port.

Specifically, each port that may receive an external fiber optic connector 100 comprises securing member 310M having a locking feature 310L that cooperates with locking feature 20L of housing 20 of respective fiber optic connector 100 when the housing 20 is fully inserted into the respective connection port for securing the connector. The housing 20 of fiber optic connector 100 may have a cooperating geometry that engages the locking feature 310L of securing member 310M of terminal 200. As best shown in FIGS. 9 and 10 depicted, locking feature 310L of securing member 310M comprises a ramp 310RP. The ramp is integrally formed at a portion of the bore 310B with the ramp angling up when looking into the input connection port 236, connection port 260 or pass-through connection port 260PT. The ramp allows the housing 20 of fiber optic connector 100 to push and translate the securing member 310M downward against the securing feature resilient member 310RM as the housing 20 is inserted in the input connection port 236. Ramp may have any suitable geometry. Once the locking feature 310L of the securing member 310M is aligned with the cooperating geometry of the locking feature 20L of fiber optic connector 100, then the securing member 310M translates upward so that the locking feature 310L engages the locking feature 20L of the fiber optic connector.

Locking feature 310L comprises a retention surface 310RS. In this embodiment, the backside of the ramp of locking feature 310L forms a ledge that cooperates with complimentary geometry on the housing 20 (or external connector). However, retention surface 310RS may have different surfaces or edges that cooperate for securing connector for creating the desired mechanical retention. For instance, the retention surface 310RS may be canted or have a vertical wall. However, other geometries are possible for the retention surface 310RS.

Connection ports of terminal 200 each comprises a respective optical connector opening 238 extending from an outer surface 234 of the terminal 200 into a cavity 216 of the terminal 200 and defining a portion of a connection port passageway 233 for receiving fiber optic connector 100. By way of explanation, the connection ports may be is molded as a portion of shell 210, but other constructions are possible such as sleeving the ports. At least one securing feature 310 is associated with the connection port passageway 233 for cooperating with the external fiber optic connector 100.

Returning to FIG. 6, terminal 200 depicts a portion of an assembly having an explanatory terminal 200 comprising a shell 210 comprising at least one input connection port 236, a plurality of connector ports 260 and a modular adapter sub-assembly 310SA associated with the input connection port 236 and each of the plurality of connector ports 260 as discussed in further detail herein.

As depicted in FIG. 6, terminals 200 disclosed may use one or more modular adapter sub-assemblies 310SA (FIGS. 7 and 8) disposed within the shell 210 when assembled for a scalable form-factor for manufacturing similar devices with different connector port counts. However, the concepts may be employed without the use of the modular adapter sub-assemblies by having the adapters mounted on a common part, but then the adapters for the individual connection ports would not "float" independently. The shell 210 comprises at least one input connection port 236 and one or more connection ports 260 respectively associated with one or more respective securing features 310 cooperating with the connection ports for providing quick and easy optical connectivity with external connectors for providing a robust and reliable assembly design that is intuitive to use. Likewise, terminals 200 may use ports for the pass-through ports 260PT as desired.

The securing feature 310 advantageously allows the user to make a quick and easy optical connection at the connector port(s) 260 of terminal 200. The securing feature 310 may also operate for providing a connector release feature by moving the actuator 310A such as a button to translate the securing member 310M to an open position (e.g., downward) for releasing the external fiber optic connector 100. As used herein, the "securing member" associated with the terminal and excludes threads and features that cooperate with bayonets. However, other terminals may use any suitable construction for attaching an external connector to the connection port.

External connectors terminated to respective optical links 10x may be retained within the respective ports of the terminal 200 by pushing and fully seating the connector within the port 260 if the securing member 310M is allowed to translate to an open position when inserting the external fiber optic connector. To release the connector from the respective port, the actuator 310A is actuated by moving the actuator 310A (e.g., pressing the button downward) and translating the securing member 310M so that the locking feature disengages from the external connector and allowing the connector to be removed from the port. Stated another way, the at least one securing feature 310 is capable of releasing the connector when a portion of the securing feature 310 (i.e,. the securing member 310M) translates within a portion of a securing feature passageway 245 of the shell 210. The full insertion and automatic retention of the connector may advantageously allow one-handed installation of the connector by merely pushing the external connector into the respective port. The devices disclosed may accomplish this connector retention feature upon full insertion by biasing the securing member 310M of the modular adapter sub-assemblies 310SA to the retain position. However, other modes of operation for retaining and releasing the connector are possible according to the concepts disclosed. As discussed, the securing feature may be designed to require actuation by translating the actuator 310A for inserting the connector; however, this may require a two-handed operation.

Shell 210 may be formed by a first portion 210A and a second portion 210B, but other constructions are possible for shell 210 using the concept disclosed. Terminal 200 may comprise mounting features 210MF that are integrally formed in the shell 210 as shown in FIGS. 4-6. Additionally, the mounting features may be separate components attached to shell 210 for mounting the device as depicted in FIG. 6. By way of example, terminals 200 show the shells 210 having mounting features 210MF disposed near the sides of shell 210. Thus, the user may simply use a fastener such as a zip-tie threaded thru these lateral passageways for mounting the terminal 200 to a wall or pole as desired. In FIG. 6 another mounting feature 210MF is disposed adjacent the first end 212 of terminal 200 and includes a mounting tab 298 attached to shell 210, and the mounting feature 210MF adjacent the second end 214 is a through hole with a support 210S. However, mounting features 210MF may be disposed at any suitable location on the shell 210 or connection port insert 230. Shell 210 may also include one or more notches on the bottom side for aiding in securing the device to a round pole or the like.

Securing member 310M may be biased by a resilient member 230RM to the retain position RP (e.g., upward). Furthermore, the securing features 310 or portions of securing features 310 may be constructed as a portion of a modular adapter sub-assemblies 310SA such as shown in FIGS. 7 and 8 for easy assembly of the terminal 200. Moreover, the modular sub-assemblies 230SA advantageously allow the mating components for each connection port 236 to move or "float" independently of other mating components relative to the shell 210 for the other connection ports for preserving optical performance. "Float" means that the adapter 230A can have slight movement in the X-Y plane for alignment, and may be inhibited from over-traveling in the Z-direction along the axis of connector insertion so that suitable alignment may be made between mating connectors, which may include a biasing spring for allowing some displacement of the adapter 230A with a suitable restoring force provided by the spring.

As best depicted in FIG. 6, a portion of actuator 310A is disposed within a portion of the securing feature passageway 245 when assembled and cooperates or engages with securing member 310M to provide linear downward translation of the respective securing member 310M. When assembled, the translating of the actuator 310A causes the securing member to translate from a retain position RP to an open position OP and vice versa. Consequently, a portion of securing feature 310 (i.e., the securing member 310M) is capable of translating within a portion of the securing feature passageway 245 transverse to the longitudinal axis of the connection port passageway when translating the actuator 310A relative to the securing feature passageway 245 or shell. If a push and click port is desired when the securing feature 310 is in the retain position, then the actuator 310A would only influence the position of the securing member 310M in one direction (and a securing feature resilient member 310RM would be used) so that the external connector may be still be inserted when the actuator 310A is placed in the retain position by allowing the translation of the securing member 310M downward upon insertion. Actuator 310A may also include a sealing feature (not numbered) for providing a seal between a portion of the securing feature 310 and the securing feature passageway 245 to inhibit dirt, dust and debris from entering the device. As shown, the sealing feature is disposed on an outer portion of the actuator 310A.

The securing member 310M comprises a bore 310B that is aligned with the connector port passageway 233 when assembled. Bore 310B is sized for receiving a suitable external connector therethrough for securing the same for optical connectivity. Bores or openings through the securing member 310M may have any suitable shape or geometry for cooperating with its respective external connector (or housing 20). As used herein, the bore may have any suitable shape desired including features on the surface of the bore for engaging with the desired connector. Bore 310B is disposed on the securing member 310M may also comprise any suitable locking feature disposed within the bore 310B as desired. For instance, the locking feature 310L disposed within the bore 310B may be a pin, pin with a ramp, or other suitable structure for engaging with the external connector.

In some embodiments, a portion of the securing member 310M is capable of moving to an open position when inserting a suitable external connector 10 into the connection port passageway 233. When the connector 10 is fully inserted into the connector port passageway 233, the securing member 310M is capable of moving to the retain position automatically. Consequently, the external connector is secured within the respective port by the securing feature 310 without turning a coupling nut or a bayonet on the external connector like the prior art terminals. Stated another way, the securing member 310M translates from the retain position to an open position as the external fiber optic connector 100 is inserted into the respective port. The securing feature passageway 245 is arranged transversely to a longitudinal axis LA of the terminal 200, but other arrangements are possible. Other securing features may operate in a similar manner and use an opening instead of a bore that receives the connector therethrough.

Generally speaking, the connection port passageways may be configured for the specific connector intended to be received in the port. Likewise, the connection port passageways should be configured for receiving the specific rear connector 252 for mating and making an optical connection with the external fiber optic connector 100.

The terminal 200 may also comprise at least one adapter 230A aligned with the respective connector port 260. Adapter 230A and other components are a portion of the modular sub-assembly 310SA as depicted in FIGS. 7 and 8. Adapter 230A is suitable for securing a rear connector 252 thereto for aligning the rear connector 252 with the respective port. One or more optical fibers may be routed from the second coupler (C2) to the respective output connector ports 260 of the terminal 200. For instance, the rear connectors 252 may terminate the optical fibers 92' that are in optical communication with the second coupler (C2) for optical connection at connector ports 260.

A plurality of rear connectors 252 are aligned with the respective connector port passageways within the cavity 216 of the terminal 200. The rear connectors 252 are associated with one or more of the plurality of optical fibers 92'. Each of the respective rear connectors 252 aligns and attaches to a structure such as the adapter 230A or other structure related to the connection port passageway in a suitable matter. The plurality of rear connectors 252 may comprise a suitable rear connector ferrule 252F as desired and rear connectors 252 may take any suitable form from a simple ferrule that attaches to a standard connector type inserted into an adapter. By way of example, rear connectors 252 may comprise a resilient member for biasing the rear connector ferrule 252F or not. Additionally, rear connectors 252 may further comprise a keying feature.

The rear connectors 252 shown in FIGS. 7 and 8 have a SC footprint, but other connectors are possible with or without the use of an adapter. As known, the SC footprint may be defined according to IEC 61754:2013. If SC connectors are used as the rear connector 252 they have a keying feature that cooperates with the keying feature of adapter 230A. Additionally, adapters 230A comprise a retention feature (not visible) for seating the adapters 230A in the device adjacent to the connection port passageway. Further, adapters 230A may comprise latch arms for securing respective rear connectors therein.

The port passageways 233 may comprise a keying portion disposed forward of the securing feature 310 in connection port passageway. The keying portion may be an additive keying portion to the primitive geometric round shape of the input connection port passageway 233 such as a male key that is disposed forward of the securing feature in the port passageway. However, the concepts for the input connection port 236 (or connector port) of terminals may be modified for different housing or connector designs or not use a keying portion at all.

In this embodiment, the rear connectors 252 are attached to optical fibers 92' that are in communication with second coupler (C2) which is in optical communication with the second optical output (OT2) as shown. When assembled, the modular adapter sub-assembly 310SA for the connector ports 260 are disposed in second portion 210B of shell 210.

Consequently, the second coupler (C2) receives the optical signal with the output power level from the second optical output (OT2) of the VRC as desired for splitting into multiple signals such as 1×N split for distribution of optical signals in the fiber optic network. For instance, the second coupler (C2) may have a 1×8 split within the terminal 200 for providing eight second coupler outputs (C201-C208) optical fibers to optically communicate with eight output connector ports 260 on the terminal 200, but any suitable number of second coupler outputs are possible. Likewise, the output connector ports 260 may be configured as a single-fiber port or multi-fiber port if desired with suitable fiber optic connectors. For the sake of simplicity and clarity in the drawings, all of the optical fiber pathways may not be illustrated or portions of the optical fiber pathways may be removed in places so that other details of the design are visible.

Additionally, the terminals or shells 210 may comprise at least one support 210S or fiber guide for providing crush support for the terminal and resulting in a robust structure. As depicted in FIG. 6, terminal 200 may comprise a support 210S configured as a support insert that fits into shell 210. Support 210S has a bore therethrough and may act as a mounting feature for the use to a fastener to mount the terminal 200. Consequently, the support 210S carries the majority of any crushing forces that may be applied by the fastener and inhibits damage to the shell 210. Support 210S may also be located and attached to the shell at a location outside of the sealing interface between the first portion 210A and the second portion 210B of shell 210. Further, the components of the shell 210 may have interlocking features between the first portion 210A and the second portion 210B of the shell 210. Specifically, portions of the terminal may have a tongue 210T and groove 210G construction for alignment or sealing of the device. As depicted, support 210S is located outside of the sealing interface of the second portion 210B of shell 210.

Terminals 200 disclosed herein may optionally be weatherproof by appropriately sealing seams of the shell 210 using any suitable means such as gaskets, O-rings, adhesive, sealant, welding, overmolding or the like. To this end, terminal 200 or devices may also comprise a sealing element 290 disposed between the first portion 210A and the second portion 210B of the shell 210. The sealing element 290 may cooperate with shell 210 geometry such as respective grooves 210G or tongues 210T in the shell 210. Grooves or tongue may extend about the perimeter of the shell 210. By way of explanation, grooves 210G may receive one or more appropriately sized O-rings or gaskets 290A for weatherproofing terminal 200, but an adhesive or other material may be used in the groove 210G. By way of example, the O-rings are suitably sized for creating a seal between the portions of the shell 210. By way of example, suitable O-rings may be a compression O-ring for maintaining a weatherproof seal. Other embodiments may use an adhesive or suitable welding of the materials for sealing the device. If welding such as ultra-sonic or induction welding of the shell is used a special sealing element 290 may be used as known in the art. If the terminal 200 is intended for indoor applications, then the weatherproofing may not be required.

To make identification of the port(s) easier for the user, a marking indicia may be used such as text or color-coding of the terminal, color codes on the actuator 310A, or marking a cable tether of an optical link (e.g. an orange or green polymer) or the like. Further, terminals may have the ports disposed in any suitable location.

FIG. 6 depicts a view of the second portion 210B of shell 210 defining a portion of cavity 216. Shell 210 may have any suitable shape, design or configuration as desired. Second portion 210B cooperates with first portion 210A (i.e., a cover) to form shell 210. Second portion 210B may comprises the input connection port 236, the output connection ports 260, or pass-through connection ports 260PT as desired. Second portion 210B provides a portion of cavity 216 of terminal 200, and the internal bottom surface of second portion 210B may comprises a plurality of alignment features 210AF for aligning one or more the modular adapter sub-assembly 310SA (FIG. 6) with the respective connection ports 260. Alignment features 210AF may have a U-shape and cooperate with the alignment features 255AF on the bottom of adapter body 255. Second portion 210B also includes a plurality of studs 210D on top of the respective connection ports 236 within cavity 216 for seating the hoop 255H of the adapter body 255 for assembly. Second portion 210B may also include a plurality of guide features 210SF for aligning the first portion 210A with the second portion 210B of the shell 210.

The second portion 210B of shell 210 may include other features. The shell 210 may comprise a keying portion (not visible) in the input connection port 236 and/or in the connector port 260. For instance, keying portion may be an additive keying portion to the primitive geometric round shape of the connection port passageway 233 such as a male key that is disposed forward of the securing feature in the connection port passageway 233. However, the concepts for the ports may be modified for different housings 20 of the fiber optic connector 100 and/or the connector designs. For instance, the keying portion may be defined as a walled-portion across part of the connection port passageway so that the input connection port 236 or connection port 260 with the keying portion would be able to properly receive a housing 20 of an external fiber optic connector having a portion with a proper D-shape.

As shown in FIG. 6 the second portion 210B of shell 210 may comprise structure on the front end 212 that cooperates with mounting tab 298 for aligning and attaching the same to the shell 210 of the terminal 200. In other embodiments, the mounting tab could be integrally formed with the shell 210, but that requires a more complex molding process.

As shown, the connector ports of the terminal 200 may comprise a marking indicia such as an embossed number or text, but other marking indicia are also possible. For instance, the marking indicia may be on the securing feature 310 such as text on the sliding actuator or the sliding actuator(s) may be color-coded to indicate fiber count, input or output for the associated connection port or input port.

FIG. 7 shows an assembled view of the modular adapter sub-assembly 310SA for the connector ports 260 depicted in FIG. 6. Modular adapter sub-assemblies 310SA enable quick and easy assembly of terminals 200 in a scalable manner. Moreover, the modular sub-assemblies 230SA advantageously allow the mating components (i.e., the adapters 230A) corresponding to each connection port 236 to move or "float" independently of other the other modular adapter sub-assemblies 310SA relative to the shell 210 for preserving optical performance.

FIG. 7 also depicts the rear connector 252 (internal connector of the terminal 200) attached to adapter 230A in addition to modular adapter sub-assembly 310SA with a rear connector 252. FIG. 8 depicts an exploded view of the modular adapter sub-assembly 310SA and shows that the rear connector 252 is not a portion of modular adapter sub-assembly 310SA. Modular adapter sub-assemblies 310SA comprises an adapter 230A aligned with the at least one connector port 260 when assembled. Adapter 230 may be biased by a resilient member 230RM.

As best shown in FIG. 8, modular adapter sub-assembly 310SA comprises a portion of securing feature 310 and a securing feature resilient member 310RM. Specifically, modular adapter sub-assembly 310SA comprises securing member 310M. However, other embodiments could also comprise an actuator 310A as part of the assembly. Securing member 310M is inserted into a front end of an adapter body 255 along with securing feature resilient member 310RM. Specifically, the rim or upper portion of securing member 310M is inserted into a hoop 255H of adapter body 255 and standoffs 310SO are disposed in a portion of the resilient member pocket 255SP at the bottom of the adapter body 255. Securing feature resilient member 310RM is disposed in the resilient member pocket 255SP for biasing the securing member 310M to a retain position (i.e., upward) as shown in FIG. 7. This construction advantageously keeps the assembly intact using the securing feature resilient member 310RM. Standoffs 310SO of adapter body 255 may also act as stops to limit the translation of the securing member 310.

In this embodiment, modular adapter sub-assembly 310SA may comprises an adapter body 255, securing member 310M, securing feature resilient member 310RM, a ferrule sleeve 230FS, a ferrule sleeve retainer 230R, resilient member 230RM, a retainer along with the adapter 230A. Adapter body 255 has a portion of the connection port passageway 233 disposed therein.

As best depicted in FIG. 8, the is resilient member 230RM is assembled so that is disposed over a barrel of adapter 230A and seated on the flange of adapter 230A, then retainer 240 can be attached to adapter body 255 using latch arms 240LA to secure the same. Ferrule sleeve retainer 230R and ferrule sleeve 230FS are aligned for assembly into the adapter 230A for assembly as shown and seated using the ferrule sleeve retainer 230R. Of course, other variations of the modular adapter sub-assembly 310SA are possible.

The modular sub-assemblies 310SA for the connector ports 260 may be assembled into the second portion 210B of shell 200 as depicted by FIG. 6. As shown, modular adapter sub-assemblies 310AS are aligned and installed onto the U-shaped alignment features 210AF of the second portion 210B of shell 210. Specifically, the alignment features 210AF of the second portion 210B of shell 210 cooperating with the alignment features 255AF on the bottom of adapter body 255 (FIG. 8) to align the same with the connector ports 260. Further, the hoops 255H of the adapter bodies 255 disposed about the plurality of studs 210D on top of the respective connector ports 260 within cavity 216 for aligning the modular adapter sub-assembly 310SA within the second portion 210B of shell 210 for aligning the connection port passageway 233 of the adapter body 255 with the connection port passageway 233 of the shell 210.

First portion 210A of shell 210 may also comprises alignment features sized and shaped for cooperating with the alignment features on the top of adapter body 255 for securing the same when the terminal is assembled. The respective alignment features only allow assembly of the modular adapter sub-assemblies 310SA into the shell 210 in one orientation for the correct orientation of the locking feature 310L with respect to the connection port 236.

The sealing member is sized for the perimeter of the actuator for sealing the securing feature passageway 245. Actuator 310A may also include a stop surface that is larger than the opening in the shell 210 and retains the actuator 310A within the securing feature passageway 245 when assembled and inhibits the actuator from being removed from the terminal 200 when assembled.

Actuator 310A may also be a different color or have a marking indicia for identifying the port type. For instance, the actuator 310A may have a first color for connector ports 260 and a second color for pass-through ports, multi-fiber ports or ports for split signals. Other marking indicia schemes may be used as desired.

When an external fiber optic connector is inserted into the respective port, locking feature of the external connectors are disposed within bore 310B of securing member 310M. As shown in FIGS. 9-11, locking feature 310L is configured as ramp 310RP that runs to a short flat portion, then to a ledge for creating the retention surface 310RS for engaging and retaining the external connector (or housing 20) once it is fully-inserted into the connector port passageway of the connector port 260. Consequently, the securing feature 310 is capable of moving to an open position (OP) when inserting a suitable fiber optic connector 100 into the connector port passageway 233 since the connector housing 20 engages the ramp 310RP pushing the securing feature downward during insertion. However, other locking features may be used with the concepts disclosed herein.

Securing member 310M may also comprises standoffs 310 as best shown in FIG. 11. Standoffs 310SO cooperate with the resilient member pocket 255SP of the adapter body 255 for keeping the bore 310B in the proper rotational orientation within the respective to the adapter body 255. Specifically, standoffs 310 have curved shapes that only allow the securing member 310M to fully-seat into the adapter body 255 when oriented in the proper orientation.

As best shown in FIG. 8, adapter body 255 comprises an adapter body bore 255B that comprises a portion of the connection port passageway 233 when assembled. As discussed, adapter body 255 comprises alignment features 255AF on the bottom of adapter body 255 that cooperate with the shell 210 to align and seat the same in the shell 210. Adapter body 255 also comprises hoop 255H. Hoop 255H captures a portion of the securing member 310M when assembled, and also seats the adapter body 255 in the second portion 210B of shell 210 during assembly. Adapter body 255 also comprises alignment features 255AFT on the top of adapter body 255 for securing the same in the first portion 210A of the shell 210 when the terminal 200 is assembled. Adapter body 255 also comprise resilient member pocket 255SP at the bottom of the adapter body 255 for capturing the securing feature resilient member 310RM as depicted in FIG. 7.

Adapter 230A comprises a plurality of resilient arms 230RA comprising securing features (not numbered). Adapter 230A also comprises an adapter key 230K for orientating the adapter 230A with the adapter body 255. Securing features 230SF cooperate with protrusions on the housing of rear connector 252 for retaining the rear connector 252 to the adapter 230A. The ferrule 252F is disposed within the ferrule sleeve 230FS when assembled. Ferrule sleeves 230FS are used for precision alignment of mating ferrules between internal connectors 252 and the external connectors. Adapters 230A are secured to an adapter body 255 using retainer 240. Adapters 230A may be biased using a resilient member 230RM as shown. Rear connectors 252 may take any suitable form and be aligned for mating with the connector secured with the connection ports 236 in any suitable manner. Devices may use alternative rear connectors if desired and can have different structures for supporting different rear connectors.

As depicted in FIGS. 12-15, housing 20 of fiber optic connector 100 comprises an outer surface OS having a locking feature 20L integrally formed in the outer surface OS. Locking feature 20L is used for holding the connector 100 in the port of the terminal 200. The housing 20 may also include a keying portion 20KP for orientating the rotational position upon insertion into the input connection port of the terminal. For instance, the keying portion 20KP may comprise a female key, but other keys may be used. The female key would cooperate with protrusion or male key disposed on the passageway of the input connection port of the terminal. Additionally, the locking feature 20L may be orientated relative to the keying portion 20L in any suitable fashion. By way of explanation, the locking feature 20L may be disposed about 180 degrees from the keying portion 20KP or the female key. Of course, other rotational orientations may be possible with the concepts disclosed. An O-ring 65 may be disposed on housing 20. The O-ring may be disposed rearward of the locking feature 20L for sealing the housing 20 to the input connection port 236.

Locking feature 20L of housing 20 may have any suitable geometry desired. For instance, the locking feature 20L may comprise a notch, a groove, a shoulder or a scallop as desired. As depicted, locking feature 20L comprises a notch integrally formed in the outer surface OS of housing 20, but other structures are possible. In this instance, the notch comprises a ramp with a ledge. The ledge is formed at the forward end of the notch to form a retention force for holding the housing. However, retention surface 310RS may have different surfaces or edges that cooperate for securing the cable input device and creating the desired mechanical retention. For instance, the ledge may be canted or have a vertical wall. However, other geometries are possible such as a hole for receiving a pin on the securing feature of the terminal.

The concepts disclosed allow relatively small terminals 200 having a relatively high-density of connections along with an organized arrangement for connectors 10 attached to the terminals 200. Shells have a given height H, width W and length L that define a volume for the terminal as depicted in FIG. 4. By way of example, shells 210 of terminal 200 may define a volume of 800 cubic centimeters or less, other embodiments of shells 210 may define the volume of 400 cubic centimeters or less, other embodiments of shells 210 may define the volume of 100 cubic centimeters or less as desired. Some embodiments of terminals 200 comprise a connection port insert 230 having a port width density of at least one connection port 236 per 20 millimeters of width W of the terminal 200. Other port width densities are possible such as 15 millimeters of width W of the terminal. Likewise, embodiments of terminals 200 may comprise a given density per volume of the shell 210 as desired.

The concepts disclosed allow relatively small form-factors for multiports as shown in Table 1. Table 1 below compares representative dimensions, volumes, and normalized volume ratios with respect to the prior art of the shells (i.e., the housings) for multiports having 4, 8 and 12 ports as examples of how compact the multiports of the present application are with respect to convention prior art multiports. Specifically, Table 1 compares examples of the conventional prior art multiports such as depicted in FIG. 1 with multiports having a linear array of ports. As depicted, the respective volumes of the conventional prior art multiports of FIG. 1 with the same port count are on the order of ten times larger than multiports with the same port count as disclosed herein. By way of example and not limitation, the multiport may define a volume of 400 cubic centimeters or less for 12-ports, or even if double the size could define a volume of 800 cubic centimeters or less for 12-ports. Multiports with smaller port counts such as 4-ports could be even smaller such as the shell or multiport defining a volume of 200 cubic centimeters or less for 4-ports, or even if double the size could define a volume of 200 cubic centimeters or less for 4-ports. Devices with sizes that are different will have different volumes form the explanatory examples in Table 1 and these other variations are within the scope of the disclosure. Consequently, it is apparent the size (e.g., volume) of multiports of the present application are much smaller than the conventional prior art multiports of FIG. 1. Of course, the examples of Table 1 are for comparison purposes and other sizes and variations of multiports may use the concepts disclosed herein as desired.

One of the reasons that the size of the multiports may be reduced in size with the concepts disclosed herein is that the cable input device and/or external connectors that cooperate with the multiports have locking features that are integrated into the housing 20 of the fiber optic connector 100. In other words, the locking features for holding the fiber optic connector in the respective port of the terminal are integrally formed in the housing of the connector, instead of being a distinct and separate component.

In other words, fiber optic connectors 100 avoid bulky structures such as a coupling nut or bayonet used with conventional hardened external connectors and multiports. In other words, conventional external connectors for multiports have threaded connections or bayonets that require finger access for connection and disconnecting. By eliminating the threaded coupling nut or bayonets (which is a separate component that must rotate about the connector) the spacing between conventional connectors may be greatly reduced. Also eliminating the dedicated coupling nut from the conventional connectors also allows the footprint of the connectors to be smaller, which also aids in reducing the size of the multiports disclosed herein.

TABLE 1

Comparison of Conventional Multiport of FIG. 1 with Multiports of Present Application

| Multiport Type | Port Count | Dimension L × W × H (mm) | Volume (cm³) | Normalized Volume Ratio |
|---|---|---|---|---|
| Prior Art FIG. 1 | 4 | 274 × 66 × 73 | 1320 | 1.0 |
| | 8 | 312 × 76 × 86 | 2039 | 1.0 |
| | 12 | 381 × 101 × 147 | 5657 | 1.0 |

TABLE 1-continued

Comparison of Conventional Multiport of FIG. 1 with Multiports of Present Application

| Multiport Type | Port Count | Dimension L × W × H (mm) | Volume (cm³) | Normalized Volume Ratio |
|---|---|---|---|---|
| Linear | 4 | 76 × 59 × 30 | 134 | 0.10 |
| | 8 | 123 × 109 × 30 | 402 | 0.20 |
| | 12 | 159 × 159 × 30 | 758 | 0.14 |

Although the disclosure has been illustrated and described herein with reference to explanatory embodiments and specific examples thereof, it will be readily apparent to those of ordinary skill in the art that other embodiments and examples can perform similar functions and/or achieve like results. For instance, the connection port insert may be configured as individual sleeves that are inserted into a passageway of a device, thereby allowing the selection of different configurations of connector ports for a device to tailor the device to the desired external connector. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

I claim:

1. A fiber optic terminal for making one or more optical connections with external connectors, the fiber optic terminal comprising:
    a shell comprising a cavity;
    at least one variable ratio coupler having a portion disposed within the cavity, the at least one variable ratio coupler comprising an optical input, a first optical output, a second optical output, and a control for changing an output power level between the first optical output and the second optical output at a coupling region for tuning the output power level;
    at least one input connection port configured for receiving an external optical connector, the at least one input connection port comprising a port opening extending from an outer surface of the terminal into the cavity and defining a port passageway along a longitudinal axis; and
    a pass-through output connection port.

2. The fiber optic terminal of claim 1, wherein the control is disposed within the shell.

3. The fiber optic terminal of claim 2, wherein the control comprises a non-contact structure for changing the output power level.

4. The fiber optic terminal of claim 2, wherein the control comprises a magnetic material.

5. The fiber optic terminal of claim 1, wherein a portion of the control is external to the shell for providing external access for changing the output power level between the first optical output and the second optical output.

6. The fiber optic terminal of claim 1, wherein the control is configured for moving a portion of a first optical waveguide of the first optical output and/or moving a portion of a second optical waveguide of the second optical output.

7. The fiber optic terminal of claim 6, wherein the portion of the first optical waveguide and the portion of the second optical waveguide are fused together at the coupling region.

8. The fiber optic terminal of claim 1, wherein the shell comprises at least one input connection port in optical communication with the optical input of the variable ratio coupler.

9. The fiber optic terminal of claim 1, wherein the pass-through output connection port in optical communication with the first optical output.

10. The fiber optic terminal of claim 1, wherein a second coupler is in optical communication with the second optical output.

11. The fiber optic terminal of claim 10, wherein the second coupler comprises a plurality of second coupler outputs, and the plurality of second coupler outputs are in optical communication with a plurality of output connection ports.

12. The fiber optic terminal of claim 11, wherein one of the plurality of output connection ports further comprises a securing feature biased to a retain position by a feature resilient member.

13. The fiber optic terminal of claim 12, wherein the securing feature comprises a bore having a locking feature for securing an external connector.

14. The fiber optic terminal of claim 13, wherein the locking feature of the housing comprises a ramp with a ledge.

15. The fiber optic terminal of claim 13, wherein the locking feature comprises a retention surface.

16. The fiber optic terminal of claim 1, wherein the terminal is weatherproof.

17. The fiber optic terminal of claim 1, wherein the first optical output or the second optical output is optically connected to a fiber optic connector disposed within the cavity of the terminal for optical connection within the terminal.

18. The fiber optic terminal of claim 1, wherein the shell defines a volume of 800 cubic centimeters or less.

19. The fiber optic terminal of claim 1, wherein the fiber optic terminal has a port width density of at least one connection port per each 20 millimeters of width of terminal.

20. A fiber optic terminal for making one or more optical connections with external connectors, the fiber optic terminal comprising:
    a shell comprising a cavity;
    at least one variable ratio coupler having a portion disposed within the cavity, the at least one variable ratio coupler comprising an optical input, a first optical output, a second optical output, and a control for changing an output power level between the first optical output and the second optical output at a coupling region for tuning the output power level, wherein a portion of a first optical waveguide of the first optical output and a portion of a second optical waveguide of the second optical output are fused together to form the coupling region, and the control is configured for moving a portion of the coupling region for changing the output power level between the first optical output and the second optical output; and
    a plurality of output connection ports, and each of the respective output connection ports configured for receiving an external optical connector.

21. The fiber optic terminal of claim 20, wherein the control is disposed within the shell.

22. The fiber optic terminal of claim 21, wherein the control comprises a non-contact structure for changing the output power level.

23. The fiber optic terminal of claim 21, wherein the control comprises a magnetic material.

24. The fiber optic terminal of claim 20, wherein a portion of the control is external to the shell for providing external access for changing the output power level between the first optical output and the second optical output.

25. The fiber optic terminal of claim 20, wherein the shell comprises at least one input connection port in optical communication with the optical input of the variable ratio coupler.

26. The fiber optic terminal of claim 20, wherein one of the plurality of optical connection ports comprises a pass-through port output connection port in optical communication with the first optical output.

27. The fiber optic terminal of claim 20, wherein a second coupler is in optical communication with the second optical output.

28. The fiber optic terminal of claim 27, wherein the second coupler comprises a plurality of second coupler outputs, and the plurality of second coupler outputs are in optical communication with some of the plurality of output connection ports.

29. The fiber optic terminal of claim 20, wherein one of the plurality of output connection ports further comprises a securing feature biased to a retain position by a securing feature resilient member.

30. The fiber optic terminal of claim 29, wherein the securing feature comprises a bore having a locking feature for securing an external connector.

31. The fiber optic terminal of claim 30, wherein the locking feature of the housing comprises a ramp with a ledge.

32. The fiber optic terminal of claim 30, wherein the locking feature comprises a retention surface.

33. The fiber optic terminal of claim 20, wherein the first optical output or the second optical output is optically connected to a fiber optic connector disposed within the cavity of the terminal for optical connection at one of the plurality of output connection ports.

34. The fiber optic terminal of claim 20, wherein the shell defines a volume of 800 cubic centimeters or less.

35. The fiber optic terminal of claim 20, wherein the fiber optic terminal has a port width density of at least one connection port per each 20 millimeters of width of terminal.

36. A fiber optic network comprising:
    a fiber optic terminal for making one or more optical connections with external connectors, the fiber optic terminal comprising:
        a shell comprising a cavity;
        at least one variable ratio coupler having a portion disposed within the cavity, the at least one variable ratio coupler comprising an optical input, a first optical output, a second optical output, and a control for changing an output power level between a first optical output and the second optical output, wherein a portion of a first optical waveguide of the first optical output and a portion of a second optical waveguide of the second optical output form a coupling region, and the control is configured for moving a portion of the coupling region, wherein control allows changing the output power level between the first optical output and the second optical output for tuning the output power level;

a first optical link in optical communication with the optical input of the fiber optic terminal; and a second optical link in optical communication with the first optical output of the fiber optic terminal or the second optical output of the terminal.

37. The fiber optic network of claim 36, wherein the fiber optic terminal comprises at least one input connection port in optical communication with the optical input of the variable ratio coupler.

38. The fiber optic network of claim 36, wherein the fiber optic terminal further comprises a pass-through output connection port in optical communication with the first optical output.

39. The fiber optic network claim 36, wherein a connector of the second optical link is optically connected to the pass-through output connection port.

40. The fiber optic network of claim 36, wherein the second optical link is optically connected to a second fiber optic terminal.

41. The fiber optic network of claim 40, wherein the second fiber optic terminal comprises a variable ratio coupler.

42. The fiber optic network of claim 36, wherein a second coupler is in optical communication with the second optical output of the fiber optic terminal.

43. The fiber optic network of claim 42, wherein the second coupler comprises a plurality of second coupler outputs, and the plurality of second coupler outputs are in optical communication with a plurality of output connection ports.

44. The fiber optic network of claim 43, wherein one of the plurality of output connection ports further comprises a securing feature biased to a retain position by a feature resilient member.

45. The fiber optic network of claim 44, wherein the securing feature comprises a bore having a locking feature for securing an external connector.

46. The fiber optic network of claim 45, wherein the locking feature of the housing comprises a ramp with a ledge.

47. The fiber optic network of claim 45, wherein the locking feature comprises a retention surface.

48. The fiber optic network of claim 36, wherein the first optical output or the second optical output is in optically communication with a fiber optic connector disposed within the cavity of the terminal.

49. The fiber optic network of claim 36, wherein the shell defines a volume of 800 cubic centimeters or less.

50. The fiber optic network of claim 36, wherein the fiber optic terminal has a port width density of at least one connection port per 20 millimeters of width of terminal.

51. The fiber optic network of claim 36, wherein the VRC comprises an asymmetric split of the output power level between a first optical output and the second optical output.

52. The fiber optic network of claim 36, wherein the portion of the first optical waveguide and the portion of the second optical waveguide are fused together at the coupling region.

\* \* \* \* \*

UNITED STATES PATENT AND TRADEMARK OFFICE
CERTIFICATE OF CORRECTION

PATENT NO. : 11,886,010 B2
APPLICATION NO. : 17/063930
DATED : January 30, 2024
INVENTOR(S) : Douglas Llewellyn Butler Page 1 of 1

It is certified that error appears in the above-identified patent and that said Letters Patent is hereby corrected as shown below:

On the Title Page

On the page 5, in Column 1, item [56], under "U.S. Patent Documents", Line 73, delete "Ail" and insert -- Lail --.

On the page 8, in Column 2, item [56], under "Other Publications", Line 1, delete "lopp" and insert -- loop --.

On the page 8, in Column 2, item [56], under "Other Publications", Line 7, delete "Poeceedings" and insert -- Proceedings --.

In the Specification

In Column 1, Line 9, delete "2019." and insert -- 2019, --.

In the Claims

In Column 21, Lines 8-9, in Claim 9, delete "pass- through" and insert -- pass-through --.

In Column 23, Line 14, in Claim 39, delete "network claim" and insert -- network of claim --.

Signed and Sealed this
Eighteenth Day of June, 2024

Katherine Kelly Vidal
*Director of the United States Patent and Trademark Office*